(12) United States Patent
Noda et al.

(10) Patent No.: US 9,578,098 B2
(45) Date of Patent: Feb. 21, 2017

(54) MANAGEMENT SYSTEM AND MANAGEMENT METHOD

(71) Applicant: Hitachi, Ltd., Tokyo (JP)

(72) Inventors: Mitsumasa Noda, Tokyo (JP); Tomohito Uchida, Tokyo (JP); Yoshifumi Takamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 150 days.

(21) Appl. No.: 14/427,193

(22) PCT Filed: Nov. 19, 2012

(86) PCT No.: PCT/JP2012/079915
§ 371 (c)(1),
(2) Date: Mar. 10, 2015

(87) PCT Pub. No.: WO2014/076834
PCT Pub. Date: May 22, 2014

(65) Prior Publication Data
US 2015/0256621 A1 Sep. 10, 2015

(51) Int. Cl.
*H04L 29/08* (2006.01)
*H04L 12/911* (2013.01)
*G06F 3/06* (2006.01)

(52) U.S. Cl.
CPC ......... *H04L 67/1097* (2013.01); *G06F 3/0605* (2013.01); *G06F 3/067* (2013.01);
(Continued)

(58) Field of Classification Search
CPC ...... G06F 3/0605; G06F 3/0631; G06F 3/067; G06F 3/0653; G06F 3/0644; H04L 67/1097; H04L 47/70
(Continued)

(56) References Cited

U.S. PATENT DOCUMENTS 6,615,166 B1 * 9/2003 Guheen .................. G06Q 10/06
703/26
7,315,826 B1 * 1/2008 Guheen ............... G06F 17/3089
703/27
(Continued)

FOREIGN PATENT DOCUMENTS

CN 101414245 A * 4/2009 .......... G06F 11/1076
JP 2008-112276 A 5/2008
(Continued)

*Primary Examiner* — Kostas Katsikis
(74) *Attorney, Agent, or Firm* — Volpe and Koenig, P.C.

(57) ABSTRACT

A management system manages a storage system and a server computer. The management system (A) acquires the storage level pool information that includes the information of a capacity of a storage level pool from the storage system, (B) acquires the server level pool information that includes the information of a capacity of a server level pool from the server computer, (C) determines a first risk degree that indicate a risk of a depletion of a free capacity of the storage level pool based on the storage level pool information, (D) determines a second risk degree that indicate a risk of a depletion of a free capacity of a server level pool based on the server level pool information, and (E) displays the information that is associated with the first risk degree that indicate a risk of a depletion of a free capacity of the storage level pool and the second risk degree that indicate a risk of a depletion of a free capacity of the server level pool.

14 Claims, 23 Drawing Sheets

(52) U.S. Cl.
CPC .......... G06F 3/0631 (2013.01); G06F 3/0644 (2013.01); G06F 3/0653 (2013.01); H04L 47/70 (2013.01)

(58) Field of Classification Search
USPC ........................................................ 709/226
See application file for complete search history.

(56) References Cited

U.S. PATENT DOCUMENTS

| | | | | |
|---|---|---|---|---|
| 8,046,767 B2* | 10/2011 | Rolia | .................... | G06Q 10/06 709/223 |
| 8,307,186 B2* | 11/2012 | Ando | .................... | G06F 3/0605 711/171 |
| 8,656,136 B2* | 2/2014 | Yamamoto | ............ | G06F 3/0605 711/112 |
| 9,058,125 B2* | 6/2015 | Yamamoto | ............ | G06F 3/0605 |
| 9,411,746 B2* | 8/2016 | Yamamoto | ............ | G06F 3/0605 |
| 2008/0104350 A1 | 5/2008 | Shimizu et al. | | |
| 2008/0271039 A1* | 10/2008 | Rolia | .................... | G06Q 10/06 718/105 |
| 2010/0077158 A1 | 3/2010 | Asano et al. | | |
| 2010/0138627 A1* | 6/2010 | Ossia | .................... | G06F 3/0619 711/171 |
| 2011/0066823 A1* | 3/2011 | Ando | .................... | G06F 3/0605 711/171 |
| 2011/0246526 A1* | 10/2011 | Finkelstein | ....... | G06F 17/30286 707/784 |
| 2012/0030404 A1* | 2/2012 | Yamamoto | ............ | G06F 3/0605 711/6 |
| 2012/0221611 A1 | 8/2012 | Watanabe et al. | | |
| 2012/0226519 A1* | 9/2012 | Copeland | ........... | G06Q 10/0635 705/7.28 |
| 2013/0226652 A1* | 8/2013 | Bilello | ............... | G06Q 10/0635 705/7.28 |
| 2014/0136780 A1* | 5/2014 | Yamamoto | ............ | G06F 3/0605 711/114 |
| 2015/0242329 A1* | 8/2015 | Yamamoto | ............ | G06F 3/0605 711/5 |

FOREIGN PATENT DOCUMENTS

| | | | | |
|---|---|---|---|---|
| JP | 2011-128852 A | 6/2011 | | |
| JP | 4815518 B2 | 9/2011 | | |
| WO | WO 2011010344 A1 * | 1/2011 | .......... | G06F 3/0616 |
| WO | 2011/074152 A1 | 6/2011 | | |
| WO | 2011/096014 A1 | 8/2011 | | |
| WO | WO 2012085975 A1 * | 6/2012 | .......... | G06F 3/0608 |
| WO | WO 2013038442 A1 * | 3/2013 | .......... | G06F 3/0608 |
| WO | WO 2013175529 A1 * | 11/2013 | ........ | G06F 12/0871 |

\* cited by examiner

| VOL identifier | TOTAL capacity | USED capacity | FREE capacity | Disk device identifier |
|---|---|---|---|---|
| ST-VOL1 | 200GB | 100GB | 100GB | DISK1, DISK2, DISK3, DISK4 |
| ST-VOL2 | 300GB | 0GB | 300GB | DISK5, DISK6, DISK7, DISK8, DISK9, DISK10 |
| ST-VOL3 | 200GB | 50GB | 150GB | DISK11, DISK12, DISK13, DISK14 |
| ... | ... | ... | ... | ... |

| LLP identifier | TOTAL capacity | ASSIGNED capacity | USED capacity | FREE capacity | VOL identifier | REDUCIBLE capacity | Corresponded storage | Risk degree | Influence degree |
|---|---|---|---|---|---|---|---|---|---|
| LLP1 | 1000GB | 1000GB | 800GB | 200GB | ST-VOL1 ST-VOL2 | 50GB | STRAGE 1 | Danger | 12 |
| LLP2 | 1000GB | 2000GB | 500GB | 500GB | ST-VOL3 ST-VOL4 | 100GB | STRAGE 2 | Caution | 7 |
| ... | ... | ... | ... | ... | ... | ... | ... | ... | ... |

| LL-VVOL identifier | TOTAL capacity | USED capacity | FREE capacity | LLP identifier |
|---|---|---|---|---|
| LL-VVOL1 | 500GB | 400GB | 100GB | LLP1 |
| LL-VVOL2 | 500GB | 400GB | 100GB | LLP1 |
| LL-VVOL3 | 1000GB | 500GB | 500GB | LLP2 |
| ... | ... | ... | ... | ... |

| HLP identifier | TOTAL capacity | ASSIGNED capacity | USED capacity | FREE capacity | LL-VVOL identifier | REDUCIBLE capacity | Connection method | Corresponded physical server | Risk degree | Influence degree |
|---|---|---|---|---|---|---|---|---|---|---|
| HLP1 | 500GB | 1000GB | 400GB | 100GB | LL-VVOL1 | 100GB | SAN | SV1 | Danger | 10 |
| HLP2 | 500GB | 500GB | 400GB | 100GB | LL-VVOL2 | 50GB | SAN | SV1 | Caution | 4 |
| HLP3 | 500GB | 0GB | 200GB | 300GB | — | — | HDD | SV2 | Safe | 0 |
| ... | ... | ... | ... | ... | ... | ... | ... | ... | ... | ... |

| HL-VVOL identifier | TOTAL capacity | USED capacity | FREE capacity | HLP identifier | REDUCIBLE capacity | VHD type | VHD file size |
|---|---|---|---|---|---|---|---|
| HL-VVOL1 | 500GB | 150GB | 350GB | HLP1 | 50GB | Dynamic | 200GB |
| HL-VVOL2 | 500GB | 150GB | 350GB | HLP1 | 50GB | Dynamic | 200GB |
| HL-VVOL3 | 400GB | 250GB | 150GB | HLP2 | 50GB | Dynamic | 300GB |
| HL-VVOL4 | 100GB | 50GB | 50GB | HLP3 | 0GB | Fixed | 100GB |
| ... | ... | ... | ... | ... | ... | ... | ... |

| VFS identifier | TOTAL capacity | USED capacity | FREE capacity | HL-VVOL identifier | Corresponded VM identifier |
|---|---|---|---|---|---|
| VFS1 | 300GB | 100GB | 200GB | HL-VVOL1 | VM1 |
| VFS2 | 200GB | 50GB | 150GB | HL-VVOL1 | VM1 |
| VFS3 | 500GB | 150GB | 350GB | HL-VVOL2 | VM2 |
| ... | ... | ... | ... | ... | ... |

| Improvement point (HLP identifier) | Extensibility | LLP identifier | Maximum extensible capacity |
|---|---|---|---|
| HLP1 | Extensible | — | 100GB |
| HLP1 | Extension of LLP is necessary | LLP1 | 200GB |
| ... | ... | ... | ... |

| Improvement point (HLP identifier) | Unnecessary VM identifier | Reducible capacity |
|---|---|---|
| HLP1 | VM2 | 150GB |
| HLP3 | VM4 | 200GB |
| ... | ... | ... |

| Improvement point (HLP identifier) | Migration destination HLP identifier | Target HL-VVOL | Target HL-VVOL capacity |
|---|---|---|---|
| HLP1 | HLP3 | HL-VVOL1 | 200GB |
| HLP1 | HLP4 | HL-VVOL2 | 200GB |
| ... | ... | ... | ... |

| Improvement point (LLP identifier) | Maximum extensible capacity |
|---|---|
| LLP1 | 500GB |
| LLP2 | 300GB |
| ... | ... |

| Improvement point (LLP identifier) | Migration source LLP identifier | Target VOL | Target VOL capacity |
|---|---|---|---|
| LLP1 | LLP3 | HL-VVOL1 | 200GB |
| LLP1 | LLP4 | HL-VVOL2 | 200GB |
| ... | ... | ... | ... |

| VM identifier | Cause region (LLP identifier or HLP identifier) | Risk degree |
|---|---|---|
| VM1 | HLP1 | Danger |
| VM1 | LLP1 | Caution |
| VM2 | HLP2 | Caution |
| ... | ... | ... |

| VM identifier | Last use data and time | Risk degree |
|---|---|---|
| VM1 | 2012/8/12 21:40:00 | Danger |
| VM2 | 2011/6/30 22:50:30 | Caution |
| VM3 | 2012/8/12 17:15:00 | Safe |
| ... | ... | ... |

■HLP

| HLP identifier | Risk degree | Influence degree |
|---|---|---|
| HLP1 | ⚠ Danger | 6 |
| HLP2 | ⚠ Caution | 3 |
| HLP5 | ⚠ Danger | 8 |

■LLP

| LLP name | Risk degree | Influence degree |
|---|---|---|
| LLP1 | ⚠ Danger | 20 |
| LLP4 | ⚠ Caution | 12 |
| LLP8 | ⚠ Caution | 25 |

MANAGEMENT SYSTEM AND MANAGEMENT METHOD

TECHNICAL FIELD

The present invention relates to a technique for managing a storage system and a server computer.

BACKGROUND ART

In recent years, a capacity virtualization technique has been used for a storage system and a server computer for the purpose of increasing the intensity to reduce a cost. As the capacity virtualization technique, there can be mentioned a virtual hard disk that is configured to be used for a virtual computer (VM) for instance. For a virtual hard disk file, there are a virtual hard disk of a fixed type in which a file of a size that is equivalent to a disk size of a virtual hard disk is prepared in creation and a virtual hard disk of a variable type in which a file size is extended in accordance with a volume usage size on a virtual hard disk. The virtual hard disk of a variable type consumes only a capacity that is being used as a practical matter. Consequently an extra capacity is not consumed and a resource can be utilized with no waste. A similar capacity virtualization technique exists for a storage system.

In the case where such a capacity virtualization technique is used, since an actual physical capacity and a logical capacity that is allocated to a server/virtual server (virtual machine) are greatly different from each other, a management has a tendency to be complicated. Moreover, in the case where a physical capacity is depleted, there is a real possibility that a work is stopped by a disk I/O error and a virtual computer that is configured to use a virtual hard disk of a variable type on a volume in which a capacity has been depleted is stopped.

As a technique for simplifying a management of a computer system in which a capacity virtualization technique is used and a management is complicated, a technique that is disclosed in Patent Literature 1 is publicly known. The technique that is disclosed in Patent Literature 1 is a technique for executing an extension of a storage pool and a migration of a virtual server in the case where a value that is called an END-TO-END leverage ratio that is a ratio of a total capacity of one or more server level virtual volumes that are corresponded to a storage level pool to a capacity of the storage level pool exceeds a threshold value.

CITATION LIST

Patent Literature

[PTL 1]
Japanese Patent Publication No. 4815518

SUMMARY OF INVENTION

Technical Problem

The technique that is disclosed in Patent Literature 1 is a technique that is effective for adjusting a ratio of a logical allocation capacity to a total physical capacity of a computer system in such a manner that the ratio is suppressed to be within a certain value. However, there is a real possibility that a processing of a computer system is stopped, for instance, a stoppage of a virtual machine cannot be detected in an appropriate manner.

Such a situation will described by citing a specific example in the following.

FIG. 28 is a view showing an example of a status for a computer system in which a capacity virtualization according to a Thin-Provisioning technique is carried out for the both of a storage system and a server computer.

The total capacity of a storage level pool (LLP) of a storage system is 300 GB and a used capacity thereof is 100 GB. The total capacity of LL-VVOL1 in a storage level virtual volume (LL-VVOL) that has been configured for the LLP is 100 GB and a used capacity thereof is 90 GB. The total capacity of LL-VVOL2 is 100 GB and a used capacity thereof is 10 GB. The total capacity of HLP1 that is a server level pool (HLP) that is configured by LL-VVOL1 is 100 GB and a used capacity thereof is 90 GB. Moreover, the total capacity of HLP2 that is a server level pool (HLP) that is configured by LL-VVOL2 is 100 GB and a used capacity thereof is 10 GB.

The total capacity of HL-VVOL1 in a server level virtual volume (HL-VVOL) that is configured for the HLP1 is 100 GB and a used capacity thereof is 40 GB. The total capacity of HL-VVOL2 that is configured for the HLP1 is 50 GB and a used capacity thereof is 20 GB. The total capacity of HL-VVOL3 that is configured for the HLP2 is 50 GB and a used capacity thereof is 10 GB.

In the status shown in FIG. 28, the total capacity of the HLP1 is 100 GB and a used capacity thereof is 90 GB. Consequently, a remaining capacity that can be used is only 10 GB and there is a real possibility that a capacity of the HLP1 is depleted. In the case where a capacity of the HLP1 is depleted, there is a real possibility that the virtual servers (VM1 and VM2) that are operated using an area on the HLP1 are stopped.

On the other hand, according to the technique that is disclosed in Patent Literature 1, in the status shown in FIG. 28, a capacity of the LLP is 300 GB and the total capacity of all HL-VVOLs that are corresponded to the LLP is 200 GB. Consequently, an END-TO-END leverage ratio that is calculated to be 100*(200/300)=67%. Since an END-TO-END leverage ratio is 67%, it is indicated that the total capacity that has been allocated to a virtual machine sufficiently falls within a physical capacity that is included in the storage system. In addition, a manager (user) cannot recognize that there is a real possibility that the virtual server is stopped.

Solution to Problem

A management system is configured to manage a storage system configured to comprise one or more volumes which belongs to a storage level pool and a server computer coupled to the storage system and configured to execute a computer program.

The storage system is configured to supply a storage level virtual volume that is associated with the storage level pool, and an or all areas of the storage level virtual volume are areas to which areas in the one or more volumes which belong to the storage level pool are not allocated. The server computer is configured to manage a server level pool to which the storage level virtual volume belongs and is configured to supply a server level virtual volume that is associated with the server level pool.

The management system comprises a communication interface device, a storage device, and a processor that is coupled to the communication interface device and the storage device. The communication interface device is configured to communicate with the storage system and the server computer. The processor is configured to (A) acquire the storage level pool information that includes the information of a capacity of the storage level pool from the storage system and store the storage level pool information to the storage device, (B) acquire the server level pool information that includes the information of a capacity of the server level pool from the server computer and store the server level pool information to the storage device, (C) determine a first, risk degree that indicate a risk of a depletion of a free capacity of the storage level pool based on the storage level pool information, (D) determine a second risk degree that indicate a risk of a depletion of a free capacity of the server level pool based on the server level pool information, and (E) display the information that is associated with the first risk degree that indicate a risk of a depletion of a free capacity of the storage level pool and the second risk degree that indicate a risk of a depletion of a free capacity of the server level pool. The communication interface device, can also be a plurality of communication interface devices of different types. The storage device can also be a plurality of storage devices, for instance, a memory such as a main storage device and a storage device such as an auxiliary storage device.

Advantageous Effects of Invention

According to the present invention, a risk of a stoppage of a wide variety of processing in which a server level pool and a storage level pool are utilized can be detected in an appropriate manner for the computer system.

BRIEF DESCRIPTION OF DRAWINGS

FIG. 3A is a view showing an example of a configuration of a volume information table 1000.

FIG. 3B is a view showing an example of a configuration of a storage level pool information table 1100.

FIG. 4A is a view showing an example of a configuration of a storage level virtual volume, information table 1200.

FIG. 4B is a view showing an example of a configuration of a server level pool information table 1300.

FIG. 5A is a view showing an example of a configuration of a server level virtual volume information table 1400.

FIG. 5B is a view showing an example of a configuration of a virtual server level file system information table 1500.

FIG. 6A is a view showing an example of a configuration of a server level virtual volume extension table 1700.

FIG. 6B is a view showing an example of a configuration of an unnecessary virtual server table 1600.

FIG. 7A is a view showing an example of a configuration of a migration table 1900.

FIG. 7B is a view showing an example of a configuration of a storage level pool extension table 1800.

FIG. 8A is a view showing an example of a configuration of an inter-storage level pool volume adjustment table 2000.

FIG. 8B is a view showing an example of a configuration of a virtual server risk degree table 2100.

FIG. 9 is a view showing an example of a configuration of a virtual server information table 2200.

FIG. 15 is a view showing an example of a display screen for displaying a risk degree of a storage level pool and a server level pool.

DESCRIPTION OF EMBODIMENTS

Figure 1:
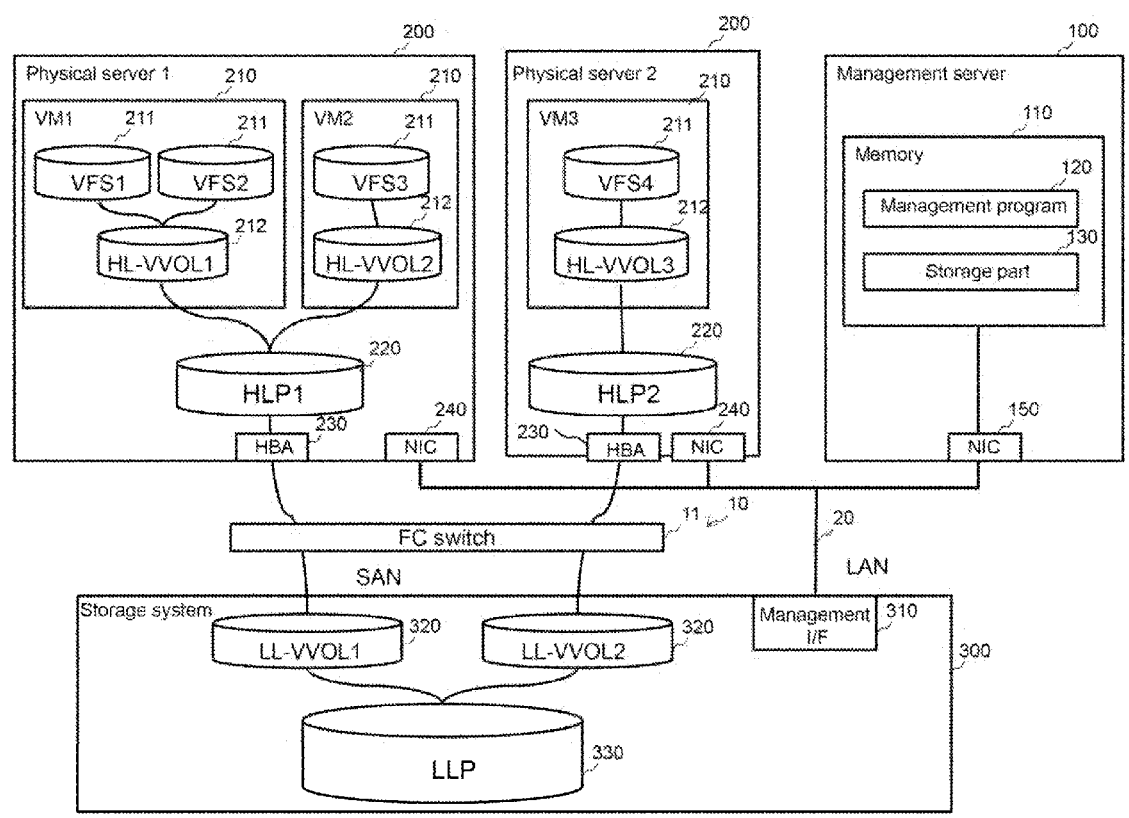
FIG. 1 is a view showing a configuration of a computer system according to an embodiment of the present invention.

An embodiment will be described with reference to drawings in the following. The embodiment that will be described in the following do not restrict, the invention according to the claims, and all of elements and all of combinations of the elements that will be described in the embodiment are not necessarily essential for the means for solving the problems of the invention.

In the following descriptions, while the information according to the present invention will be described in the expression such as "aaa table" in some cases, the information can be represented by other than the data structure such as a table. In order to indicate that the information is not depended on a data structure, the expression of "aaa table" can also be referred to as "aaa information" in some cases.

In the following descriptions, the processing will be described while a "program" or a program module is handled as a subject in some cases. In the case where the program or the program module is executed by a processor (CPU (Central Processing Unit) in a quintessential way), the predetermined processing is executed while using a memory and an I/F (interface). Consequently, a subject of a processing can also be a processor. The processing that is disclosed while a program is handled as a subject can also be a processing that is executed by a management system (for instance, a management server that will be described later). Moreover, a part, or a whole of a program can also be implemented by a dedicated hardware. A wide variety of programs can be installed to each of the computers by a program distribution server or a storage medium that can be read by a computer. The storage medium can also be an IC card, an SD card, and a DVD for instance.

Moreover, an aggregate of one or more computers that are configured to manage a computer system and to display the display information may be called a management system in some cases. In the case where a management server displays the display information, the management server is a management system. Moreover, a combination of the management server and a display computer is also a management system. A processing that is equivalent to the management server can also be implemented by using a plurality of computers for speeding up and increasing reliability for a management processing. In this case, the plurality of computers is a management system (in the case where a display is executed by the display computer, the display computer can also be included in the plurality of computers).

An act of "display" of as management system (or as processor) can also be any one of an act of displaying the information on a display device of the management system by the management system and an act of transmitting the information that is displayed on as display device to another computer that is provided with a display device by the management system.

A "volume" is a logical storage area (a logical volume) that is supplied based on one or more physical storage devices such as hard disk drives or flash memories). The volume is supplied based on a storage space of a RAID (Redundant Array of Independent (or Inexpensive) Disks) group for instance. The RAID group is configured by a plurality of physical storage devices, and data is stored according to a determined RAID level. The "volume" can also be written as VOL in some cases.

A "storage level pool" is a pool that is constructed by one or more volumes. An area of the storage level pool is allocated to a write destination area from a physical server for a storage level virtual volume. The storage level pool can also be an aggregate of a plurality of pools (virtual pools) to which one or more volume belong. The "storage level pool" is an example of a lower level pool and is written as LLP in some cases.

A "storage level virtual volume" is a virtual volume that is supplied by a storage controller. All of areas (storage areas) of the storage level virtual volume are not necessarily allocated to a physical storage area. More specifically, an area of one or more volumes that belong to the storage level pool is not allocated to a part or a Whole of areas of the storage level virtual volume in the initial stage for instance. In other words, An area of the storage level pool can also be allocated to an area of the storage level virtual volume in the initial stage for instance. Here, the initial stage is immediately after the storage level virtual volume is defined or after the storage level virtual volume is defined and is accessible from a physical server for instance. The "storage level virtual volume" is written as LL-VVOL in some cases.

A "server level pool" is a storage area that is constructed from one or more storage level virtual volumes to which a server (a physical server or a virtual server) has been allocated from the storage system. The server level pool is used from a virtual server via a server level virtual volume. More specifically, in the case where data is written from a virtual server to a server level virtual volume, an area of a server level pool is allocated to a write destination area of the data (an area of a server level virtual volume). A write request that specifies an area in the storage level virtual volume that is corresponded to an area that have been allocated is transmitted from a physical server to a storage system that supplies the storage level virtual volume. A storage controller of the storage system allocates an area in the storage level pool to an area that is specified by the write request tan area in the storage level virtual volume) in response to the write request, and writes data to the area that has been allocated. More specifically, data is written to a physical storage area (an area in a physical storage device) that is a basis of the area that has been allocated tan area in the storage level pool). The "server level pool" is an example of an upper level pool and is written as HLP in some cases.

A "server level virtual volume" is a virtual volume that is constructed by a virtualization program of a server. All of storage areas of the server level virtual volume are not necessarily allocated to a physical storage area. A storage area of the server level virtual volume is accessed by a virtual server. The server level virtual volume is recognized as a virtual hard disk (VHD) for a server level pool. The "server level virtual volume" is written as HL-VVOL in some cases.

The server level virtual volume is managed in such a manner that a capacity of a volume is extended in accordance with a used capacity of a volume on a virtual hard disk. However, even in the case where a used capacity of a volume on a virtual hard disk is reduced, a capacity of a volume that has been extended is not reduced in an automated way. In the present embodiment, a capacity reduction processing is executed in which a capacity that is equal to or larger than a used capacity on a virtual hard disk for the server level virtual volume is reduced to be a capacity that is equivalent to a used capacity on a virtual hard disk. The processing in which a capacity that is equal to or larger than a used capacity on a virtual hard disk for the server level virtual volume is reduced to be a capacity that is equivalent to a used capacity on a virtual hard disk is referred to as a "capacity reduction of the server level virtual volume".

A computer system according to the present embodiment will be described in the first place.

For the computer system according to the present embodiment, a management server collects the storage level pool information from the storage system, collects the server level storage pool information from physical server of a management target, analyzes a risk of that the storage level pool and the server level pool provoke a stoppage of the processing from the acquired information, and displays the result of the analysis. The details will be described in the following.

FIG. 1 is a view showing a configuration of a computer system according to an embodiment of the present invention.

The computer system is provided with a storage system 300, a physical server 200, and a management server 100. The number of at least one of the storage system 300, the physical server 200, and the management server 100 can be a plural number. Moreover, the storage system 300 can also be hierarchized.

The storage system 300 and the physical server 200 are coupled to each other via a communication network, such as a SAN 10 and a LAN 20. The SAN 10 can include an FC (Fibre channel) switch 11 for instance. The management server 100 is coupled to the storage system 300 and the physical server 200 via a communication network, such as a SAN 10 and a LAN 20.

The storage system 300 is provided with a plurality of PDEV (physical storage devices) and a plurality of storage controllers (CTL). The PDEV and the storage controllers:

are coupled to each other by using an internal network or a bus for instance. The storage controller stores data in a storage area based on the PDEV. The storage controller is provided with a processor, a memory, a management I/F 310 and so on. The management I/F 310 is an interface that is coupled to the physical server 200 and the management server 100 via the LAN 20.

The storage system 300 is provided with a storage level pool 330 that is configured by the storage areas of a plurality of PDEV. For the storage system 300, one or more storage level virtual volumes 320 (such as LL-VVOL1 and LL-VVOL2) to which an area of the storage level pool 330 is allocated are constructed.

The physical server 200 is an example of a server computer and is provided with a processor, a memory, an HBA 230, and a NIC (Network Interface Card) 240. The processor, the memory, the HBA 230, and the NIC (Network Interface Card) 240 are coupled to each other by using an internal network.

The HBA 230 is an interface that is coupled to the storage system 300 via a network such as the SAN 10 and the LAN 20. More specifically, the HBA 230 outputs an I/O request from the processor to the storage system 300 for instance. The NIC 240 is an interface that is coupled to the storage system 300 and the management server 100 via the LAN 20.

For the physical server 200, the processor executes a program that is stared in a memory to carry out a wide variety of processing. For instance, by transmitting an I/O request (a write request or a read request) to the storage system 300, the processor can execute an input/output (a write or a read) of data to one or more storage level virtual volumes 320 that are supplied by the storage system 300.

For the physical server 200, by executing a server virtualization program, the processor constructs one or more virtual server environments (a virtual server 210) by using a physical resource that is included in the physical server 200. For the physical server 200, a server level pool 220 is constructed. In the present embodiment, the HLP1 of the physical server 1 is constructed by LL-VVOL1, and the HLP2 of the physical server 2 is constructed by LL-VVOL2.

For the virtual server (VM) 210, a server level virtual volume 212 is constructed. In the present embodiment, the HL-VVOL1 based on the HLP1 is constructed for the VM1, the HL-VVOL2 based on the HLP1 is constructed for the VM2, and the HL-VVOL3 based on the HLP2 is constructed for the VM3. Moreover, for the virtual server 210, one or more file systems (VFS) 211 are constructed for managing an access to data in a file unit. In the present embodiment, the VFS1 and VFS2 are constructed on the HL-VVOL1 for the VM1, the VFS3 is constructed on the HL-VVOL2 for the VM2, and the VFS4 is constructed on the HL-VVOL3 for the VM3.

Figure 2:
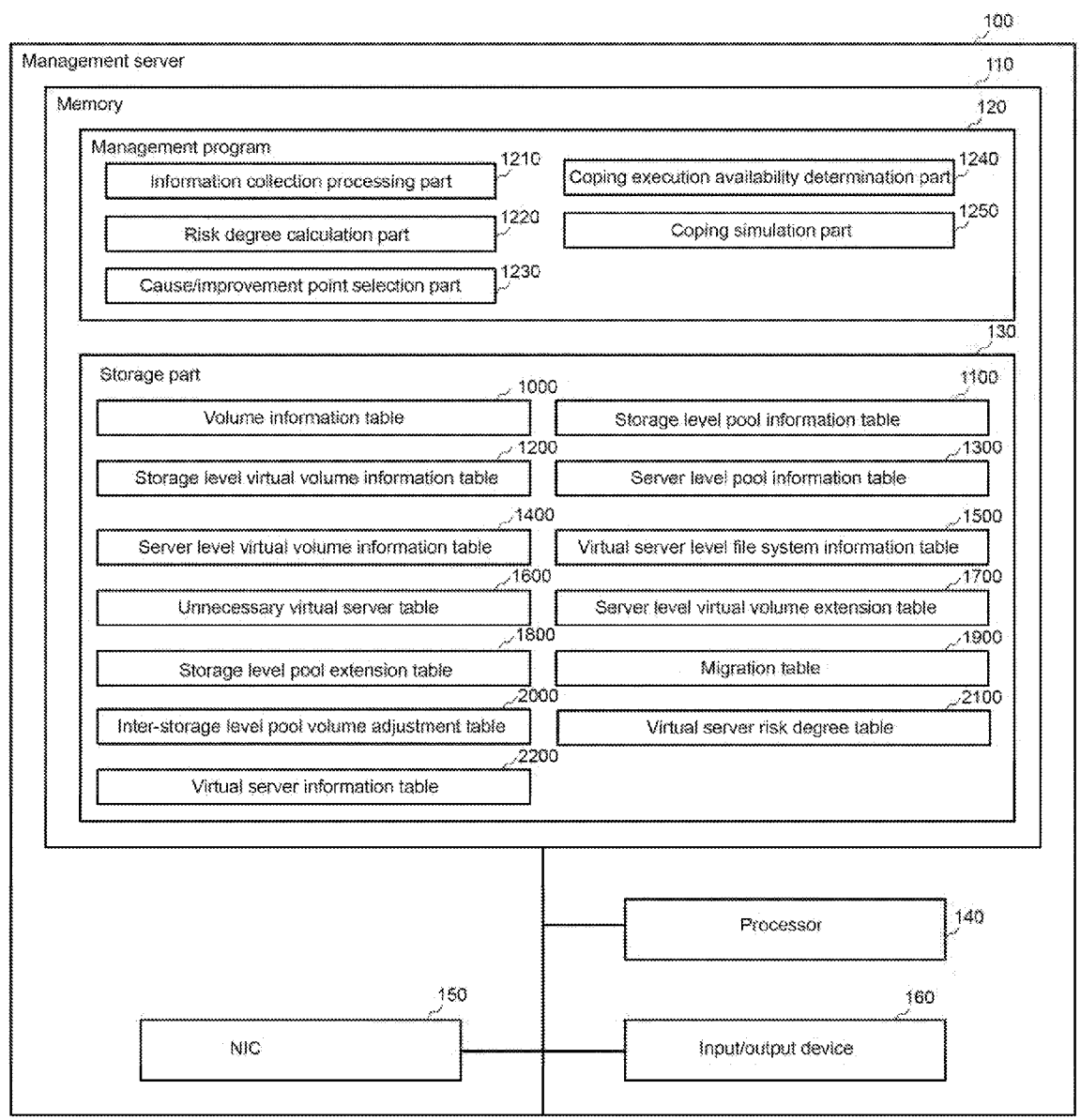
FIG. 2 is a view showing a configuration of a management server 100.

FIG. 2 is a view showing a configuration of a management server 100.

The management server 100 is a computer that is provided with a processor 140, a memory 110, and a NIC 150. The processor 140, the memory 110, and the NIC 150 are coupled to each other by an internal network.

The processor 140 carries out a wide variety of processing by executing a program that is stored in the memory 110.

The memory 110 stores a program that is executed by the processor 140 and the information that is required by the processor 140. For instance, the memory 110 stores a management program 120 and a storage part 130. The memory 110 can be a semiconductor memory, a storage device, or a combination thereof.

The management program 120 manages a storage system 300 and a physical server 200. The management program 120 includes an information collection processing part 1210, a risk degree calculation part 1220, a cause/improvement point selection part 1230, a coping execution availability determination part 1240, and a coping simulation part 1250.

The information collection processing part 1210 collects the information that is associated with a configuration of a storage level pool and the information that is associated with a configuration of a storage level virtual volume from the storage system 300 for instance. The information collection processing part 1210 collects the information that is associated with a configuration of a server level pool and the information that is associated with a configuration of a server level virtual volume from the physical server 200 for instance. Moreover, the information collection processing part 1210 can also acquire the necessary information from the information that has been acquired by other program of the management server 100 without acquiring the information from the storage system 300 and the physical server 200 in a direct manner. The risk degree calculation part 1220 calculates a risk degree that is an index for indicating a risk that raises a stoppage of a processing for a storage level pool and a server level pool and executes a processing for analyzing a risk. The cause/improvement point selection part 1230 selects a point of a cause that raises a stoppage of a processing and executes a processing for selecting a point that can improve a risk. The coping execution availability determination part 1240 executes a processing for determining whether or not a coping measure for improving a risk can be executed. The coping simulation part 1250 executes a simulation for a coping measure that has been determined as executable and executes a processing for displaying a simulation result.

The storage part 130 stores a wide variety of information. The storage part 130 stores a volume information table 1000, a storage level pool information table 1100, a storage level virtual volume information table 1200, a server level pool information table 1300, a server level virtual volume information table 1400, a virtual server level file system information table 1500, an unnecessary virtual server table 1600, a server level virtual volume extension table 1700, a storage level pool extension table 1800, a migration table 1900, an inter-storage level pool volume adjustment table 2000, a virtual server risk degree table 2100, and a virtual server information table 2200.

The volume information table 1000 stores the information that is associated with a volume. The storage level pool information table 1100 stores the information that is associated with storage level pool. The storage level virtual volume information table 1200 stores the information that is associated with a storage level virtual volume. The server level pool information table 1300 stores the information that is associated with a server level pool. The server level virtual volume information table 1400 stores the information that is associated with a server level virtual volume. The virtual server level, file system information table 1500 stores the information that is associated with a virtual server level file system. The unnecessary virtual server table 1600 stores the information that is associated with an unnecessary virtual server. The server level virtual volume extension table 1700 stores the information that is associated with an extension of a server level virtual volume. The storage level pool extension table 1800 stores the information that is associated with an extension of a storage level pool. The migration table 1900 stores the information that is associated with a migration of a server level virtual volume. The inter-storage level pool volume adjustment table 2000 stores the information that is associated with an adjustment of a volume between storage level pools. The virtual server risk degree table 2100 stores the information that is associated with a risk degree of a virtual server. The virtual server information table 2200 stores the information that is associated with a virtual server.

The NIC 150 is an interface that: is coupled to the physical server 200 and the storage system 300 via a network such as the LAN 20.

The management server 100 can be provided with an input/output device 160. The input/output device 160 in the management server 100 is also be coupled to an internal network.

It is thought that an example of the input/output device 160 is a display, a keyboard, and a pointer device. However, the input/output device 160 can also be an apparatus other than those. A substitute for the input/output device 160, a serial interface and an Ethernet (registered trademark) interface can also be used as the input/output device 160. Moreover, to display computer that is provided with a display, a keyboard, or a pointer device can also be coupled to the interface. The display information can also be transmitted to the display computer, and the display information can also be received from the display computer. By this configuration, a display for the display computer can also be executed. By receiving an input, an input/output for the input/output, device 160 can also be executed.

The management server 100 can also be divided into an apparatus for managing the storage system 300 and an apparatus for managing the physical server 200.

FIG. 3A is a view showing an example of a configuration of a volume information table 1000.

The volume information table 1000 is provided with a record in which a volume identifier 1000, a total capacity (TOTAL capacity) 1002, a used capacity (USED capacity) 1003, a free capacity (FREE capacity) 1004, and a disk device identifier 1005 are attribute values for every volume.

The volume identifier 1000 is an identifier that is allocated to a volume. The total capacity 1002 is a physical total capacity of a volume. The used capacity 1003 is a capacity of an area to which data is written and that is used as a practical matter in the total capacity. The free capacity 1004 is a capacity of an area that is not used in the total capacity. The disk device identifier 1005 is an identifier of a disk device that configures a volume. In the case where a volume is configured by a plurality of disk devices, the disk device identifier 1005 is an identifier of a plurality of disk devices.

FIG. 3B is a view showing an example of a configuration of as storage level pool information table 1100.

The storage level pool information table 1100 is provided with a record in which a storage level pool identifier 1101, a total capacity (TOTAL capacity) 1102, an allocated capacity (ASSIGNED capacity) 1103, a used capacity (USED capacity) 1104, a free rapacity (FREE capacity) 1105, a volume identifier 1106, a reducible capacity (REDUCIBLE capacity) 1107, a corresponded storage 1108, a risk degree 1109, and an influence degree 1110 are attribute values for every storage level pool.

The storage level pool identifier 1101 is an identifier that is allocated to a storage level pool. The total capacity 1102 is a physical total capacity of a storage level pool. The allocated capacity 1103 is a total value of a capacity that has been virtually allocated as a storage level virtual volume. The used capacity 1104 is a capacity of an area to which data is written and that is used as a practical matter in the total capacity 1102. The free capacity 1105 is a capacity of an area that is not used in the total capacity 1102. The volume identifier 1106 is an identifier of a volume that configures a storage level pool. The reducible capacity 1107 is a capacity that can be reduced in the case where a capacity reduction of a server level virtual volume is carried out. The corresponded storage 1108 is an identifier of a storage system 300 to which a storage level pool belongs. The risk degree 1109 is a risk degree (a first risk degree) to a depletion of a free capacity for the storage level pool. The influence degree 1110 is an influence degree that indicates a degree of an influence in the case where a depletion of a free capacity occurs.

FIG. 4A is a view showing an example of a configuration of a storage level virtual volume information table 1200.

The storage level virtual volume information table 1200 includes the information of a storage level pool to which a storage level virtual volume belongs in addition to the information that is associated with a storage level virtual volume. The storage level virtual volume information table 1200 is provided with a record in which a storage level virtual volume identifier 1201, a total capacity (TOTAL capacity) 1202, a used capacity (USED capacity) 1203, a free capacity (FREE capacity) 1204, and a storage level pool identifier 1205 are attribute values for every storage level virtual volume.

The storage level virtual volume identifier 1201 is an identifier that is allocated to a storage level virtual volume. The total capacity 1202 is a total capacity that has been allocated from a storage level pool to a storage level virtual volume The used capacity 1203 is a capacity that is used in the total capacity 1202. The free capacity 1204 is a capacity of an area that is not used in the total capacity 1202. The storage level pool identifier 1205 is an identifier of a storage level pool to which a storage level virtual volume belongs.

FIG. 4B is a view showing an example of a configuration of a server level pool information table 1300.

The server level pool information table 1300 includes the information of a storage level virtual volume to which a server level pool belongs and the information of a physical server in addition to the information that is associated with a server level pool. The server level pool information table 1300 is provided with a record in which a server level pool identifier 1301, a total capacity (TOTAL capacity) 1302, an allocated capacity (ASSIGNED capacity) 1303, a used capacity (USED capacity) 1304, a free capacity (FREE capacity) 1305, a storage level, virtual volume identifier 1306, a reducible capacity (REDUCIBLE capacity) 1307, a connection method 1308, a corresponded physical server 1309, a risk degree 1310, and an influence degree 1311 are attribute values for every server level pool.

The server level pool identifier 1301 is an identifier that is allocated to a server level pool. The total capacity 1302 is a total capacity that is allocated from a storage level virtual volume. The allocated capacity 1303 is a total value of a capacity that has been virtually allocated as a server level virtual volume. The used capacity 1304 is a capacity of an area to which data is written, and that is used as a practical matter in the total capacity 1302. The free capacity 1305 is a capacity of an area that is not used in the total capacity 1302. The storage level virtual volume identifier 1306 is an identifier of a storage level virtual volume that configures a server level pool. The reducible capacity 1307 is a capacity that can be reduced in the case where a capacity reduction of a server level virtual volume is carried out. The connection method 1308 is a connection method to a storage level virtual volume. The corresponded physical server 1309 is an identifier of a physical server 200 to which a server level pool belongs. The risk degree 1310 is a risk degree to second risk degree) to a depletion of a free capacity for the server level pool. The influence, degree 1311 is an influence degree that indicates a degree of an influence in the case where a depletion of a free capacity occurs.

FIG. 5A is a view showing an example of a configuration of a server level virtual volume, information table 1400.

The server level virtual volume information table 1400 includes the information of a server level pool to which a server level virtual volume belongs in addition to the information that is associated with a server level virtual volume. The server level virtual volume information table 1400 is provided with a record in which a server level virtual volume identifier 3401, a total capacity (TOTAL capacity) 1402, a used capacity (USED capacity) 1403, a free capacity (FREE capacity) 1404, a server level pool identifier 1405, a reducible capacity (REDUCIBLE capacity) 1406, a virtual hard disk (VHD) type 1407, and a virtual hard disk file size 1408 are attribute values for every server level virtual volume.

The server level virtual volume identifier 1401 is an identifier that is allocated to a server level virtual volume. The total capacity 1402 is a total capacity that is virtually allocated from a server level pool. The used capacity 1404 is a capacity of an area to which data is written and that is used as a practical matter in the total capacity 1402. The free capacity 1404 is a capacity of an area that is not used in the total capacity 1402. The server level pool identifier 1405 is an identifier of a server level pool to which a server level virtual volume belongs. The reducible capacity 1406 is a capacity that can be reduced by a capacity reduction. The virtual hard disk type 1407 is a type of a virtual hard disk file (a variable type or a fixed type). The variable type is a type for extending a file size of a virtual hard disk file in accordance with a used capacity of a virtual hard disk. The fixed type is a type for ensuring a file size of a total capacity of a virtual hard disk in the case where a virtual hard disk file is created. In FIG. 5A, a variable type is written as Dynamic, and a fixed type is written as Fixed. The virtual hard disk file size 1408 is a file size of a virtual hard disk file.

FIG. 5B is a view showing an example of a configuration of a virtual server level file system information table 1500.

The virtual server level file system information table 1500 includes the information of a server level virtual, volume to which a virtual server level file system belongs in addition to the information that is associated with a virtual server level file system. The virtual server level file system information table 1500 is provided with a record in which a virtual server level file system identifier 1501, a total capacity (TOTAL capacity) 1502, a used capacity (USED capacity) 1503, a free capacity (FREE capacity) 1504, a server level virtual volume identifier 1505, and a corresponded virtual server identifier 1506 are attribute values for every virtual server level file system.

The virtual server level file system identifier 1501 is an identifier that is allocated to a virtual server level file system. The total capacity 1502 is a total capacity that is allocated from a server level virtual volume. The used capacity 1503 is a capacity of an area that is used in the total capacity 1502. The free capacity 1504 is a capacity of an area that is not used in the total capacity 1502. The server level virtual volume identifier 1505 is an identifier of a server level virtual volume to which a virtual server level file system belongs. The corresponded virtual server identifier 1506 is an identifier of a virtual server that uses the virtual server level file system.

FIG. 6A is a view showing an example of a configuration of a server level virtual volume extension table 1700.

The server level virtual volume extension table 1700 is provided will a record in which an improvement point (a server level pool identifier) 1701, an extensibility 1702, a storage level pool identifier 1703, and a maximum extensible capacity 1704 are attribute values.

The improvement point (a server level pool identifier) 1701 is a point of a target in which a risk degree is improved. In the present embodiment, the improvement point 1701 is an identifier of a server level pool of a target that is improved. The extensibility 1702 is an extensibility for the improvement point 1701. The extensibility 1702 is any one of an "extensible" that indicates that an extension is possible, "HLP extensible after LLP extension" that indicates that a server level pool can be extended after a storage level pool is extended, and "extension impossible" that indicates that an extension is not possible. The storage level pool identifier 1703 is an identifier of a storage level pool that is required to be extended. The maximum extensible capacity 1704 is a maximum capacity that can be extended.

FIG. 6B is as view showing an example of a configuration of an unnecessary virtual server table 1600.

The unnecessary virtual server table 1600 is provided with a record in which an improvement point (a server level pool identifier) 1601, an unnecessary virtual server identifier 1602, and a reducible capacity 1603 are attribute values.

The improvement point 1601 is a point of a target in which a risk degree is improved. In the present embodiment, the improvement point 1601 is an identifier of a server level pool of a target that is improved. The unnecessary virtual server identifier 1602 is an identifier of a virtual server that is unnecessary. The reducible capacity 1603 is a capacity that can be deleted from a used capacity in the case where a virtual server that is unnecessary is deleted.

FIG. 7A is a view showing an example of a configuration of a migration table 1900.

The migration table 1900 includes the information of a server level virtual volume that can be migrated on a server level pool of an improvement target and a server level pool of a migration destination. The migration table 1900 is provided with as record in which an improvement point (a server level pool identifier) 1901, a migration destination server level pool identifier 1902, a target server level virtual volume 1903, and a target server level virtual volume capacity 1904 are attribute values.

The improvement point (a server level pool identifier) 1901 is an identifier of a server level pool that is a target that is improved. The migration destination server level pool identifier 1902 is an identifier of a server level pool of a migration destination of a server level virtual volume. The target server level virtual volume 1903 is an identifier of a server level virtual volume of a target of a migration. The target server level virtual volume capacity 1904 is a capacity of a server level virtual volume of a target of a migration.

FIG. 7B is a view showing an example of a configuration of a storage level pool extension table 1800.

The storage level pool extension table 1800 is provided with a record in which an improvement point (a server level pool identifier) 1801 and a maximum extensible capacity 1802 are attribute values.

The improvement point (a storage level pool identifier) 1801 is an identifier of a storage level pool that is a target that is improved. The maximum extensible capacity 1802 is a maximum capacity that can be extended for a storage level pool.

FIG. 8A is a view showing an example of a configuration of an inter-storage level pool volume adjustment table 2000.

The inter-storage level pool volume adjustment table 2000 includes the information of a volume that can be adjusted between storage level pools and the information of the capacity thereof. The inter-storage level pool volume adjustment table 2000 is provided, with a record in which an improvement point to storage level pool identifier) 2001, a migration source server level pool identifier 2002, a target volume 2003, and a target volume capacity 2004 are attribute values.

The improvement point (a server level pool identifier) 2001 is an identifier of a storage level pod that is a target that is improved. The migration source server level pool identifier 2002 is an identifier of a server level pool of as migration source for migrating a volume. The target volume 2003 is an identifier of a volume that is to be migrated. The target volume capacity 2004 is a capacity of a volume that is to be migrated.

FIG. 8B is a view showing an example of a configuration of a virtual server risk degree table 2100.

The virtual server risk degree table 2100 is provided with a record in which a virtual server identifier 2101, a cause region 2102, and a risk degree 2103, are attribute values.

The virtual server identifier 2101 is an identifier of a virtual server. The cause region 2102 is an identifier of a region that is a cause to storage level pool identifier or a server level pool identifier). The risk degree 2103 is a risk degree for a cause region.

FIG. 9 is a view showing an example of a configuration of a virtual server information table 2200.

The virtual server information table 2200 is provided with a record in which a virtual server identifier 2201, a last use data and time 2202, and a risk degree 2203, are attribute values.

The virtual server information table 2200 is an identifier of a virtual server. The last use data and time 2202 is a last use data and time when a virtual server is used. The risk degree 2203 is a risk degree (a third risk degree) for a virtual server.

An operation of a computer system according to the present embodiment will be described in the next place.

The information collection processing part 1210 of the management server 100 executes the information collection processing at an interval of a predetermined time for instance. The predetermined time can be a time that is specified by a user or can be a time that is decided by the management server 100 as it chooses.

The information collection processing part 1210 collects the information that is associated with a storage level pool and the information that is associated with a storage level virtual volume from the storage system 300, and collects the information that is associated with a server level pool and the information that is associated with a server level virtual volume from the physical server 200. In the next place, the information collection processing part 1210 stores the information that has been collected into the volume information table 1000, the storage level pool information table 1100, the storage level virtual volume information table 1200, the server level pool information table 1300, and the server level virtual volume information table 1400. By this information collection processing, it is possible to collect a wide variety of attribute values that are required for the volume information table 1000, the storage level pool information table 1100, the storage level virtual volume information table 1200, the server level pool information table 1300, and the server level virtual volume information table 1400. In the present embodiment, the information collection processing part 1210 stores a history of the information that, is associated with a capacity of a server level pool and a capacity of a storage level pool (for instance, a history of a used capacity) into the storage part 130.

Figure 10:
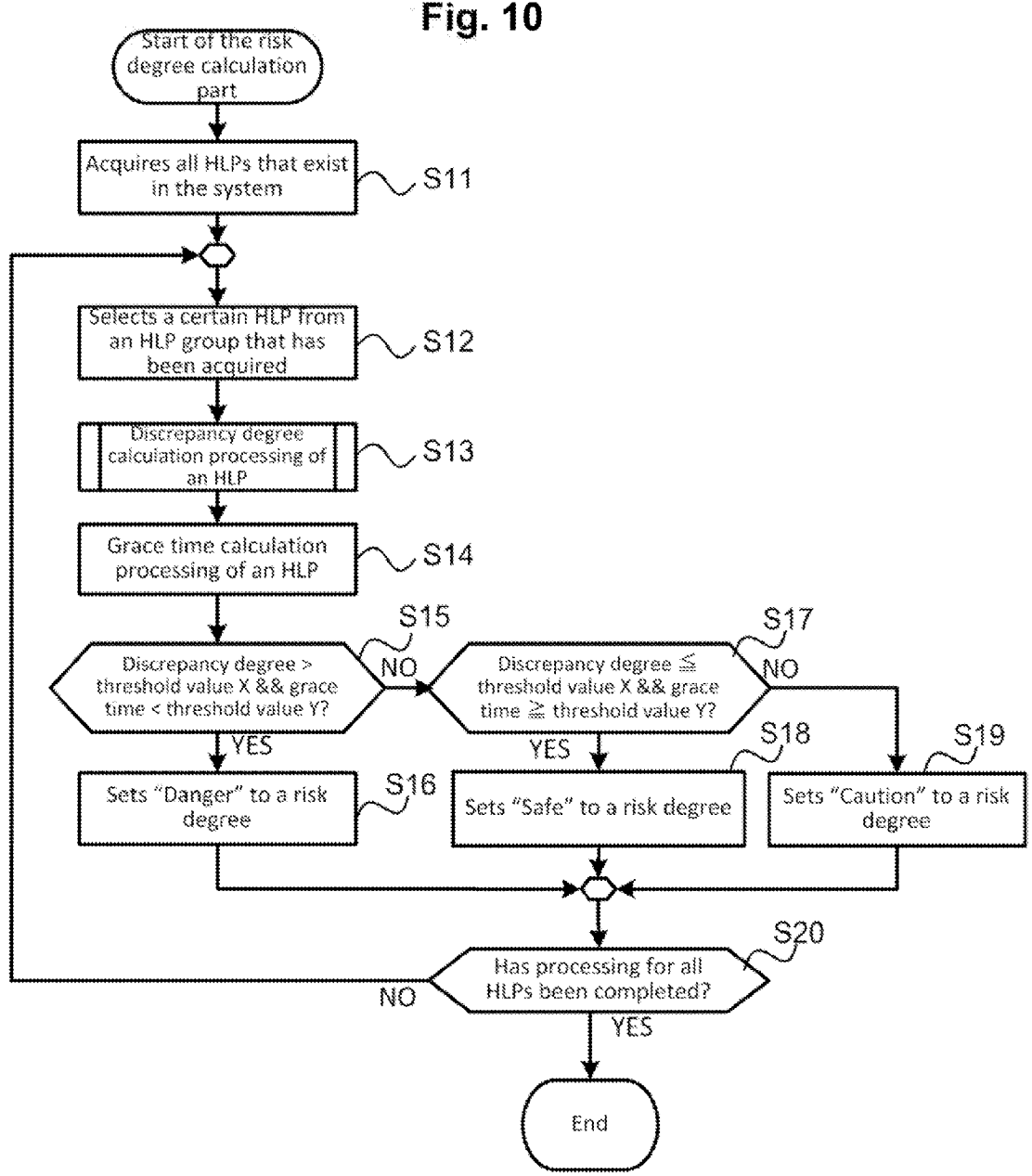
FIG. 10 is a flowchart of a risk degree calculation n processing of an HLP.

FIG. 10 is a flowchart of a risk degree calculation processing of an HLP.

A risk degree calculation processing of an HLP is executed by the risk degree calculation part 1220 after the information collection processing is executed.

(Step S11) The risk degree calculation part 1220 refers to the server level pool information table 1300 and identifies can identifier of) all server level pools that exist in the computer system.

(Step S12) The risk degree calculation part 1220 selects (an identifier of) a certain server level pool that is a processing target from a server level pool group that has been identified.

Figure 11:
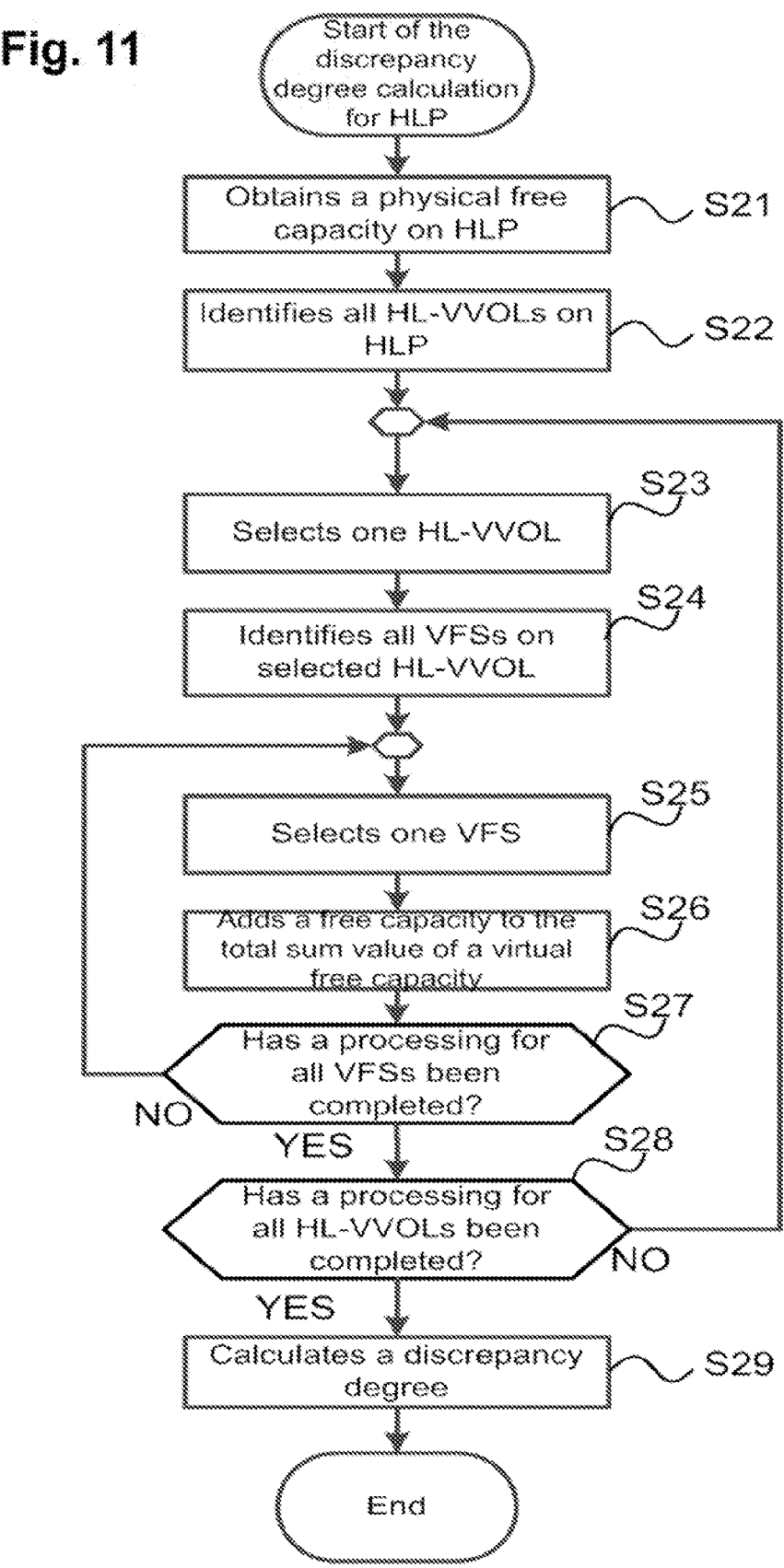
FIG. 11 is a flowchart of a discrepancy degree calculation processing of an HLP.

(Step S13) The risk degree calculation part 1220 executes a discrepancy degree calculation processing that is shown in FIG. 11 to a server level pool of a processing target. According to a discrepancy degree calculation processing of an HLP, a discrepancy degree of an HLP is calculated. Here, a discrepancy degree of an HLP indicates a degree of a discrepancy for a size of a physical free capacity of an HLP and a size of a free capacity that has been allocated virtually The details will be described in a discrepancy degree calculation processing of an HLP.

(Step S14) The risk degree calculation part 1220 executes a grace time calculation processing for calculating a grace time of an HLP to a server level pool of as processing target. Here, a grace time is a time that is estimated as a time until a physical free capacity of an HLP becomes 0 (a second grace time). As a method for calculating a grace time for instance, a history of a past use capacity of a server level pool is stored, an increased amount of a use capacity in a unit time of a server level pool is calculated from the history, and a time until a free capacity becomes 0 (a grace time a second grace time) is calculated based on an increased amount of a use capacity in a unit time that has been calculated and a free capacity 1305 of the server level pool information table 1300. A method for calculating a grace time is not restricted to this method, and can be any method as long as a time until a free capacity becomes 0 can be predicted. Moreover, a time until a Physical free capacity of a storage level pool becomes 0 (a first grace time) can also be calculated by a processing similar to the above processing.

(Steps S15 to S19) The risk degree calculation part 1220 executes a processing for determining a risk degree of a depletion of the server level pool.

A concept of a processing for determining a risk degree will be described in the following.

Figure 12:
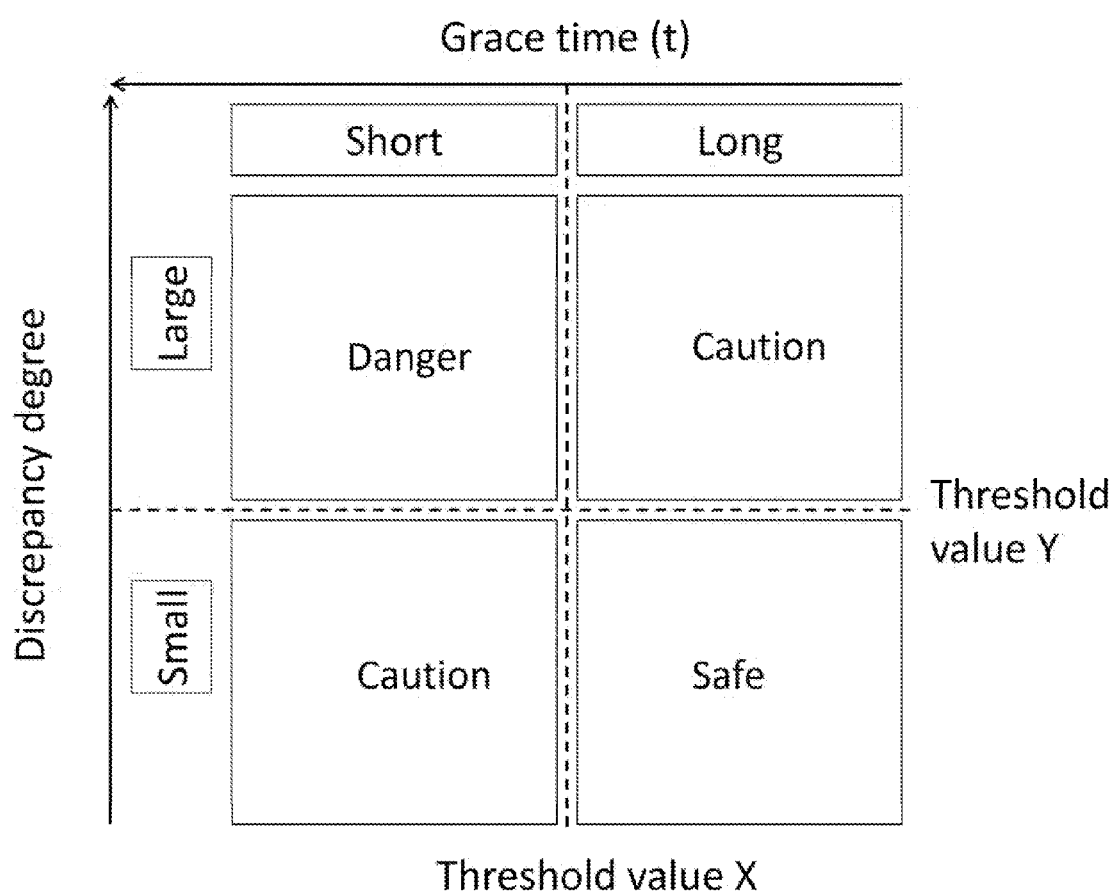
FIG. 12 is a view for illustrating a risk degree determination.

FIG. 12 is a view for illustrating a risk degree determination processing.

In the present embodiment, a risk degree of a depletion of a free capacity of the server level pool is determined by using a grace time and a discrepancy degree. Moreover, a risk degree can also be determined by using any one of a grace time and a discrepancy degree.

In the present embodiment, a threshold value X (a second threshold value) that is a standard of a grace time for determining that a risk degree of a depletion of a free capacity of the server level pool is high and a threshold value Y (a first threshold value) that is a standard of a discrepancy degree for determining that a risk degree of a depletion of a free capacity of the server level pool is high are prepared. Here, the threshold value X and the threshold value Y can also be configured uniquely in advance by the computer system, or can also be configured by a manager as one chooses.

In the present embodiment, (1) a risk degree is determined as "Danger" in the case where a grace time to the server level pool is smaller than the threshold value X (a grace time is short) and a discrepancy degree is larger than the threshold value Y, (2) a risk degree is determined as "Caution" in the case where a grace time to the server level pool is smaller than the threshold value X and a discrepancy degree is equal to or less than the threshold value Y or in the case where a grace time to the server level pool is equal to or larger than the threshold value X (a grace time is long) and a discrepancy degree is larger than the threshold value Y, and (3) a risk degree is determined as "Safe" in the case where a grace time to the server level pool is equal to or larger than the threshold value X (a grace time is long) and a discrepancy degree is less than the threshold value Y. According to this processing, a risk degree of a depletion of a free capacity of the server level pool can be determined in an appropriate manner based on the different standards of a discrepancy degree and a grace time.

The description is returned to that of FIG. 11 and the step S15 and subsequent steps will be described in detail.

(Step S15) The risk degree calculation part 1220 determines whether or not a discrepancy degree that has been calculated is larger than the threshold value X and a grace time that has been calculated is smaller than the threshold value Y. As a result, in the case where a discrepancy degree is larger than the threshold value X and a grace time is smaller than the threshold value Y (step S15: YES), the risk degree calculation part 1220 goes ahead with the processing to the step S16. On the other hand, otherwise, that is, in the case where a discrepancy degree is equal to or less than the threshold value X and a grace time is equal to or larger than the threshold value Y (step S15: NO), the risk degree calculation part 1220 goes ahead with the processing to the step S17.

(Step S16) The risk degree calculation part 1220 sets "Danger" to a risk degree 1310 of a record that is corresponded to the server level pool of a target of the server level pool information table 1300.

(Step S17) The risk degree calculation part 1220 determines whether or not a discrepancy degree that has been calculated is equal to or less than the) threshold value X and a grace time that has been calculated is equal to or larger than the threshold value Y. As a result, in the case where a discrepancy degree that has been calculated is equal to or less than the threshold value X and a grace time that has been calculated is equal to or larger than the threshold value Y (step S157: YES), the risk degree calculation part 1220 goes ahead with the processing to the step S18. On the other hand, otherwise, that is, in the case where a discrepancy degree is equal to or less than the threshold value X and a grace time is larger than the threshold value Y or a discrepancy degree is larger than the threshold value X and a grace time is equal to or less than the threshold value Y (step S17: NO), the risk degree calculation part 1220 goes ahead with the processing to the step S19.

(Step S18) The risk degree calculation part 1220 sets "Safe" to a risk degree 1310 of a record that: is corresponded to the server level pool of a target of the server level pool information table 1300.

(Step S19) The risk degree calculation part 1220 sets "Caution" to a risk degree 1310 of a record that is corresponded to the server level pool of a target of the server level pool information table 1300.

(Step S20) The risk degree calculation part 1220 determines whether or not a processing for all the server level pools that have been identified in the step S11 has been completed. As a result, in the case where a processing has not been completed (step S20: NO), the risk degree calculation part 1220 goes ahead with the processing to the step S12 and executes a processing in which a server level pool that has not been processed is a target. On the other hand, in the case where a processing for all the server level pools has been completed (step S20: YES), the risk degree calculation processing is terminated.

According to the risk degree calculation processing of the HLP, a risk degree that is associated with a depletion of a free capacity for the server level pool can be determined in an appropriate manner.

FIG. 11 is a flowchart of a discrepancy degree calculation processing of an HLP.

A discrepancy degree calculation processing of an HLP is a processing that is corresponded to the step S13 of the risk degree calculation processing of an HLP of FIG. 10.

(Step S21) The risk degree calculation part 1220 refers to a free capacity 1305 of the server level pool information table 1300 and obtains a physical free capacity of a server level pool of a processing target.

(Step S22) The risk degree calculation part 1220 searches the server level virtual volume information table 1400 and identifies a server level virtual volume that is corresponded to all records in which a value of a server level pool identifier 1405 matches up with an identifier of a server level pool of a processing target, that is, a server level virtual volume on a server level pool of a processing target.

(Step S23) The risk degree calculation part 1220 selects one of the server level virtual volumes that have been identified as a server level virtual volume of a processing target.

(Step S24) The risk degree calculation part 1220 searches the virtual server level file system information table 1500 and identifies a virtual server level file system that is corresponded to all records in which a value of a server level virtual volume identifier 1505 matches up with an identifier of a server level virtual volume of a processing target.

(Step S25) The risk degree calculation part 1220 selects one of the virtual server level file systems that have been identified as a virtual server level file system of a processing target.

(Step S26) The risk degree calculation part 1220 adds a value of a free capacity 1504 of a record that is corresponded to the virtual server level file system that has been selected for the virtual server level file system information table 1500 to the total sum value of a virtual free capacity that is a variable. The total sum value of a virtual free capacity is initialized to 0 when the discrepancy degree calculation processing of an HLP is started.

(Step S27) The risk degree calculation part 1220 determines whether or not a processing for all the virtual server level tile systems that have been identified in the step S24 has been completed. As a result, in the case where a processing for all the virtual server level file systems that have been identified has not been completed (step S27: NO), the risk degree calculation part 1220 goes ahead with the processing to the step S25. On the other hand, in the case where a processing for all the virtual server level file systems that have been identified has been completed (step S27: YES), the risk degree calculation part 1220 goes ahead with the processing to the step S28.

(Step S28) The risk degree calculation part 1220 determines whether or not a processing for all the virtual server level virtual volumes that have been identified in the step S22 has been completed. As a result, in the case where a processing for all the virtual server level virtual volumes that have been identified has not been completed (step S28: NO), the risk degree calculation part 1220 goes ahead with the processing to the step S23. On the other hand, in the case where a processing for all the virtual server level virtual volumes that have been identified has been completed (step S28: YES), the risk degree calculation part 1220 goes ahead with the processing to the step S29.

(Step S29) The risk degree calculation part 1220 calculates a discrepancy degree that is associated with a physical free capacity and a virtual free capacity for a server level pool based on the total sum value of a free capacity and a virtual free capacity that: have been obtained in the step S21. In the present embodiment, the risk degree calculation part 1220 calculates a discrepancy degree by using the following expression 1. The discrepancy degree indicates that a virtual free capacity is larger as compared with a physical free capacity as a value is larger. The discrepancy degree is an index that can indicate that a risk degree of a depletion of a free capacity of the server level pool is high in an appropriate manner.

Discrepancy degree=(total sum value of virtual free capacity−physical free capacity)/physical free capacity (Expression 1)

A discrepancy degree (a first discrepancy degree) that is associated with a physical free capacity and a virtual free capacity for a storage level pool can be calculated by a processing similar to the above processing.

Figure 28:
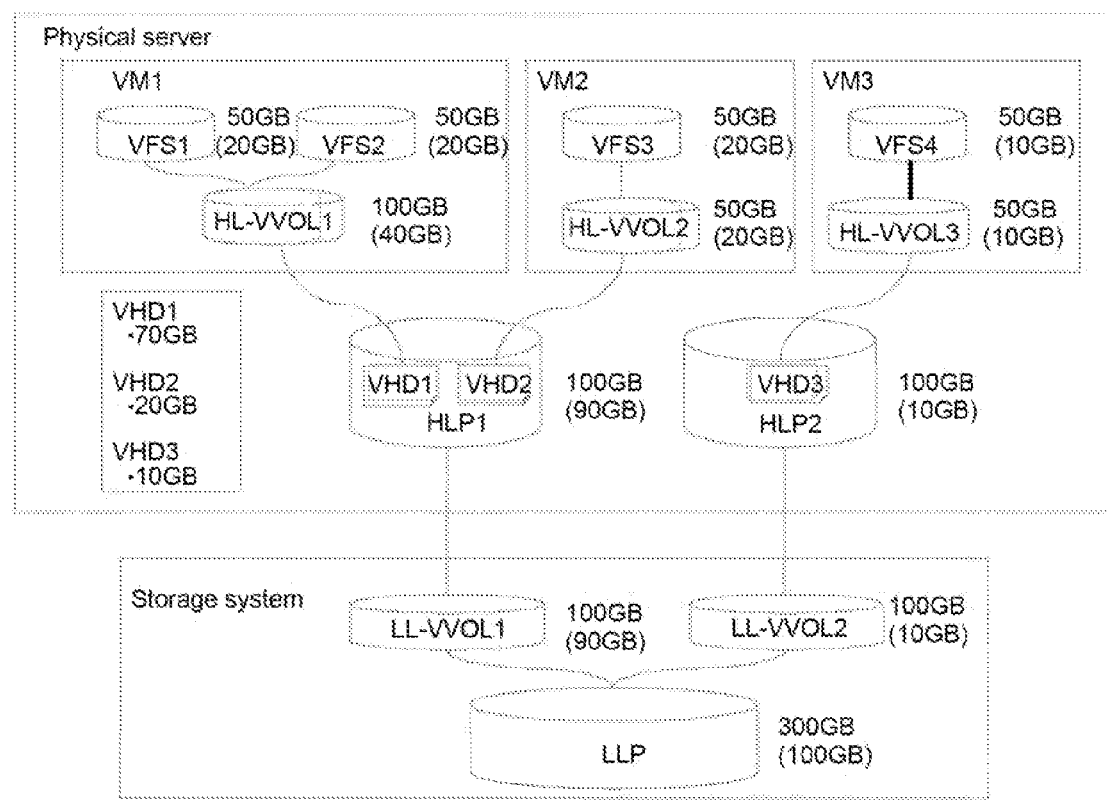
FIG. 28 is a view showing an example of a status for a computer system.

The risk degree calculation processing for the HLP1 and the HLP2 in the case where the computer system is in the status that is shown in FIG. 28 will be described in detail.

Since a physical free capacity is 10 GB and a virtual free capacity is 90 GB (30 GB on VFS1, 30 GB on VFS2, and 30 GB on VFS3) for the HLP1, as discrepancy degree is (90−10)10=8.

A trend of a past capacity of the HLP1 is that a use capacity of 3 days ago is 84 GB, a use capacity of 2 days ago is 86 GB, and a use capacity of 1 day ago is 88 GB for instance, an increased amount of a use capacity in a unit time (for instance, 1 day) is 2 GB. A grace time until a depletion of a free capacity of the HLP1 is 10/2=5 (days).

In the case where the threshold value X that is associated with a grace time that is used for determining a risk degree is assumed to be 10 and the threshold value Y that is associated with a discrepancy degree is assumed to be 3, since a discrepancy degree is 8 and is larger than the threshold value Y and a grace time is 5 and is shorter than the threshold value X for the HLP1, a risk degree is determined as "Danger".

Since a physical free capacity is 90 GB and a virtual free capacity is 40 GB (40 GB on VFS4) for the HLP2, a discrepancy degree is (40−90)/90=−0.55.

A trend of a past capacity of the HLP2 is that a use capacity of 3 days ago is 7 GB, a use capacity of 2 days ago is 8 GB, and a use capacity of 1 day ago is 9 GB for instance, an increased amount of a use capacity in a unit time (for instance, 1 day) is 21 GB. A grace time until a depletion of a free capacity of the HLP2 is 90/1=90 (days).

In this case, since a discrepancy degree is −0.55 and is equal to or less than the threshold value Y and a grace time is 90 and is equal to or larger than the threshold value X for the HLP2, a risk degree is determined as "Safe".

Figure 13:
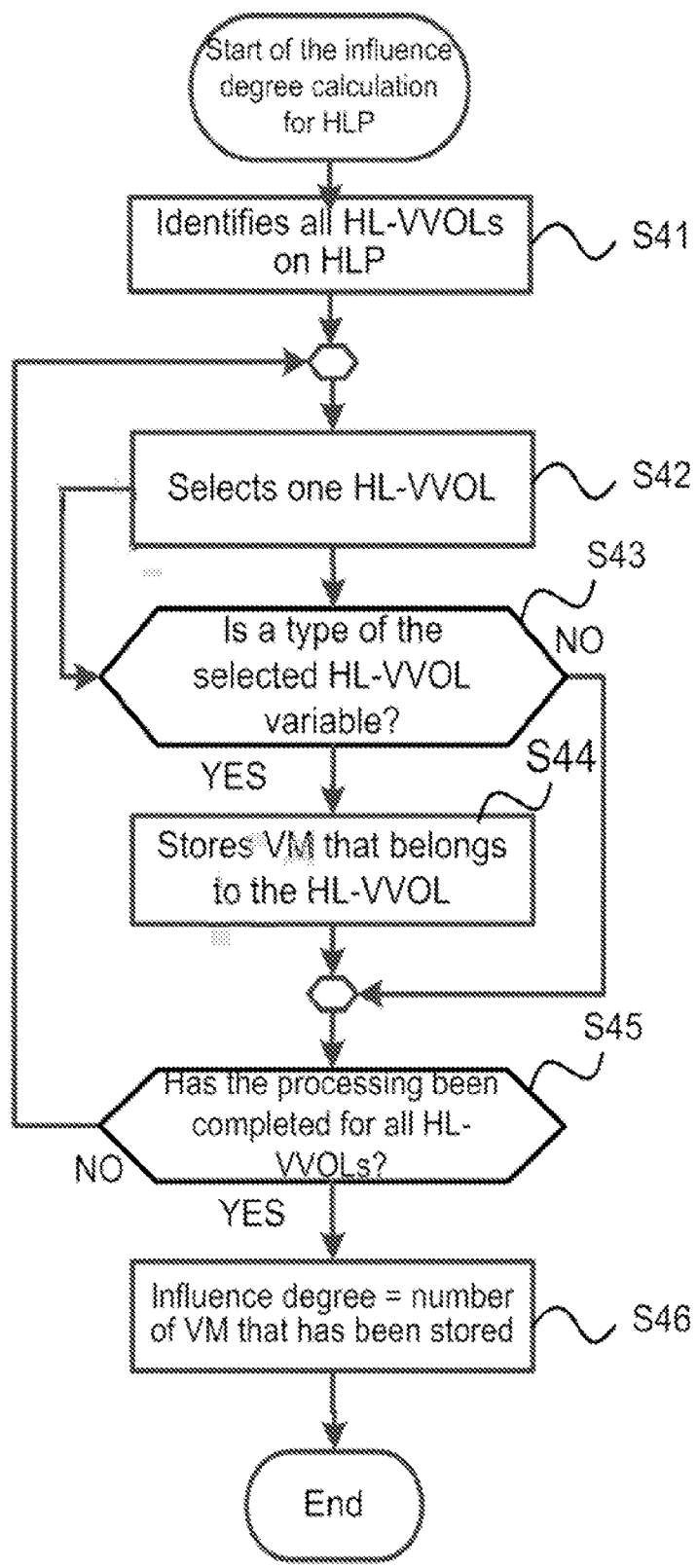
FIG. 13 is a flowchart of an influence degree calculation processing of an HLP.

FIG. 13 is a flowchart of an influence degree calculation processing of an HLP.

An influence degree calculation processing of an HLP is a processing for calculating an influence degree in the case where a free capacity of the server level pool is depleted, and is executed for each server level pool as a target at any point of time (for instance, immediately after the risk degree calculation processing of an HLP).

(Step S41) The risk degree calculation part 1220 refers to the server level virtual volume information table 1400 and identifies a server level virtual volume that is corresponded to all records in which a value of a server level pool identifier 1405 matches up with an identifier of a server level pool of a processing target, that is, a server level virtual volume on a server level pool of a processing target.

(Step S42) The risk degree calculation part 1220 selects one of the server level virtual volumes that have been identified as a server level virtual volume of a processing target.

(Step S43) The risk degree calculation part 1220 determines whether or not: a virtual hard disk type 1407 for a record that is corresponded to the selected server level virtual volume of the server level virtual volume information table 1400 is a variable type ("Dynamic"). As a result, in the case where the virtual had disk type 1407 is a variable type (step S43: YES), since there is a possibility that a capacity cannot be allocated to the server level virtual volume if a free capacity of the server level pool is depleted, the risk degree calculation part 1220 goes ahead with the processing to the step S44. On the other hand, in the case where the virtual hard disk type 1407 is not a variable type (step S43: NO), since a capacity of the server level virtual volume has already been ensured and there is no influence of a depletion of a free capacity of the server level pool, the risk degree calculation part 1220 goes ahead with the processing to the step S45.

(Step S44) The risk degree calculation part 1220 identifies a virtual server that belongs to the server level virtual volume that has been selected by referring to a corresponded virtual server identifier 1506 of the virtual server level file system information table 1500, and stores the virtual server identifier as an identifier of a virtual server that may be stopped in the case where a free capacity of the server level pool is depleted.

(Step S45) The risk degree calculation part 1220 determines whether or not a processing for all the virtual server level virtual volumes that have been identified in the step S41 has been completed. As a result, in the case where a processing for all the virtual server level virtual volumes that have been identified has not been completed (step S45: NO), the risk degree calculation part 1220 goes ahead with the processing to the step S42. On the other hand, in the case where a processing for all the virtual server level virtual volumes that have been identified has been completed (step S45: YES), the risk degree calculation part 1220 goes ahead with the processing to the step S46.

(Step S46) The risk degree calculation part 1220 stores the number of the identifiers of the virtual server that has been stored as one that may be stopped in the case where a free capacity of the server level pool is depleted into an influence degree 1311 of a record that is corresponded to the server level pool of a processing target of the server level pool information table 1300, and terminates the processing. An influence degree is not restricted to the number of the virtual servers that may be stopped, and a parameter such as a degree of importance can also be corresponded to each virtual server and an influence degree can be calculated in consideration of weighting by this parameter for instance.

The risk degree calculation processing for a server level pool and so on have been described with reference to FIG. 10 to FIG. 13. Moreover, the risk degree calculation part 1220 executes the risk degree calculation processing and so on similar to the above processing for a storage level pool. For the risk degree calculation processing for the storage level pool, a server level pool and a corresponded table and so on are substituted for a storage level pool and a corresponded table and so on in FIG. 10 to FIG. 13 in the elementary sense.

The risk degree calculation processing for the LLP in the case where the computer system is in the status that is shown in FIG. 28 will be described in detail.

Since a physical free capacity is 200 GB and a virtual free capacity is 130 GB (30 GB on VFS1, 30 GB on VFS2, 30 GB on VFS3, and 40 GB on VFS4) for the LLP, a discrepancy degree (a first discrepancy degree) is (130−200)/200=−0.35.

A trend of a past capacity of the LLP is that a use capacity of 3 days ago is 94 GB, a use capacity of 2 days ago is 97 GB, and a use capacity of 1 day ago is 100 GB for instance, an increased amount of a use capacity in a unit time (for instance, 1 day) is 3 GB. A grace time until a depletion of a free capacity of the LLP (a first grace time) is 200/3÷66 (days).

In the case where the threshold value X that is associated with a grace time that is used for determining a risk degree is assumed to be 10 and the threshold value Y that is associated with a discrepancy degree is assumed to be 3, since a discrepancy degree is −0.35 and is equal to or less than the threshold value Y and a grace time is 66 and is equal to or larger than the threshold value X for the LLP, a risk degree is determined as "Safe".

Figure 14:
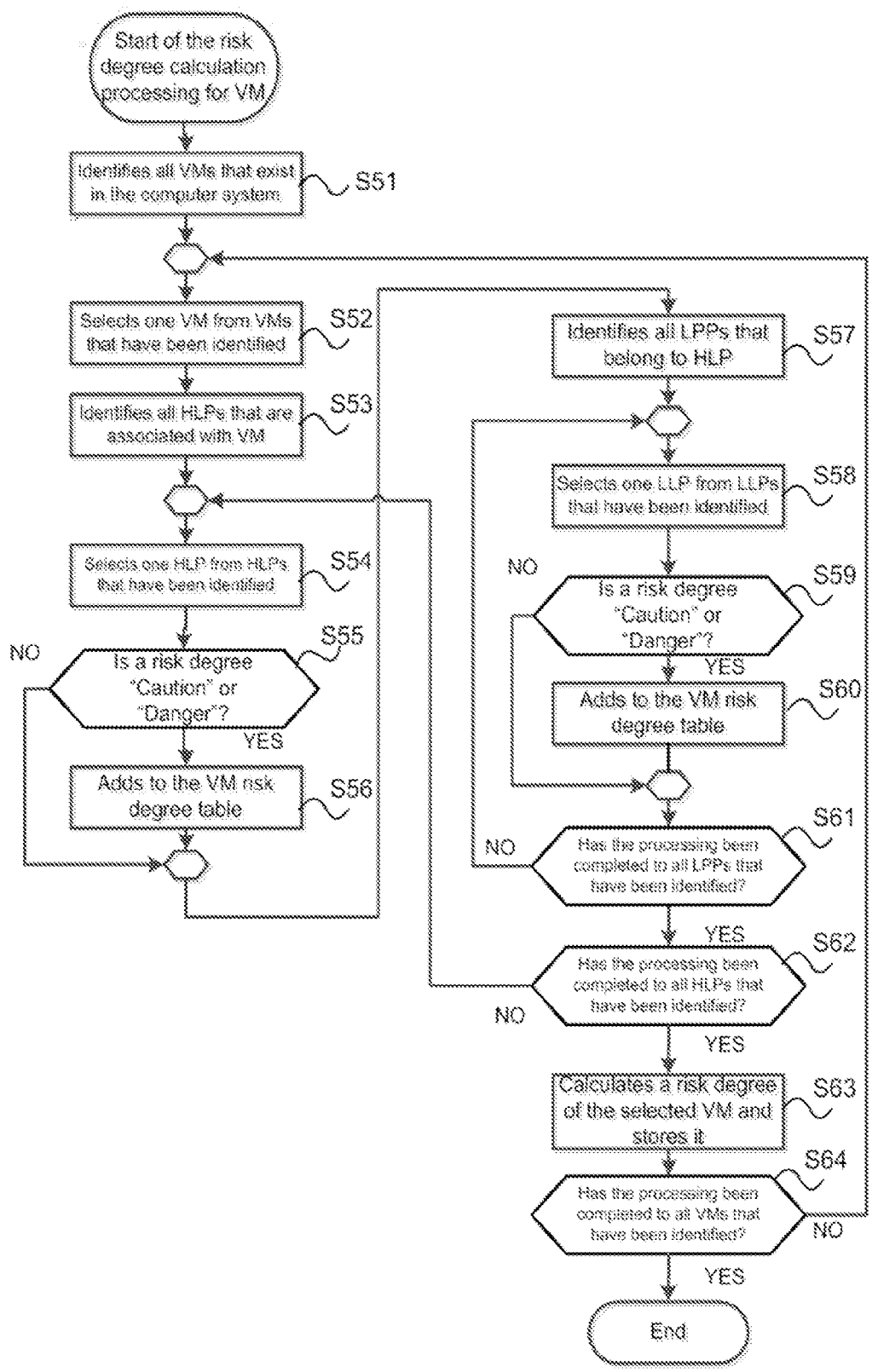
FIG. 14 is a flowchart of a risk degree calculation processing of a VM.

FIG. 14 is a flowchart of a risk degree calculation processing of a VM.

The risk degree calculation processing of a VM is executed after a risk degree calculation processing is completed to a server level pool and a storage level pool. A risk degree of a virtual server is an index for indicating a height of possibility that a virtual server is stopped by a depletion of a free capacity for a server level pool or a storage level pool.

(Step S51) The risk degree calculation part 1220 refers to the virtual server information table 2200 and identifies all virtual servers that exist in the computer system.

(Step S52) The risk degree calculation part 1220 selects one of the virtual servers that have been identified as a virtual server of a processing target.

(Step S53) The risk degree calculation part 1220 identifies an identifier of all server level pools that are associated with the virtual server that has been selected. More specifically, the risk degree calculation part 1220 refers to the server level virtual volume information table 1400 and the virtual server level file system information table 1500, and identifies an identifier of a server level pool that is corresponded to a virtual server identifier of a virtual server of a processing target.

(Step S54) The risk degree calculation part 1220 selects one of the identifiers of the server level pools that have been identified as to identifier of a server level pool of a processing target.

(Step S55) The risk degree calculation part 1220 identifies a record that is corresponded to an identifier of a server level pool of a processing target of the server level pool information table 1300, and determines whether or not a risk degree 1310 of the record is "Danger" or "Caution". As a result, in the case where a risk degree 1310 of the record is "Danger" or "Caution" (step S55: YES), the risk degree calculation part 1220 goes ahead with the processing to the step S56. On the other hand, in the case where a risk degree 1310 of the record is not "Danger" or "Caution" (step S55: NO), the risk degree calculation part 1220 goes ahead with the processing to the step S57.

(Step S56) The risk degree calculation part 1220 adds a record that is corresponded to a server level pool of a processing target to the virtual server risk degree table 2100. More specifically, the risk degree calculation part 1220 configures an identifier of a virtual server that is a processing target in the step S52 to the virtual server identifier 2101, configures an identifier of the server level pool that has been selected in the step S54 to the cause region 2102, and adds a record in which a value of the risk degree 1310 that has been determined in the step S55 has been configured to the risk degree 2103 to the virtual server risk degree table 2100.

(Step S57) The risk degree calculation part 1220 identifies an identifier of all storage level pools that belong to the server level pool that has been selected. More specifically, the risk degree calculation part 1220 refers to the storage level virtual volume information table 1200 and the server level pool information table 1300, and identifies an identifier of a storage level pool that is corresponded to an identifier of a server level pool of a processing target.

(Step S58) The risk degree calculation part 1220 selects one of the identifiers of the storage level pools that have been identified as a identifier of a storage level pool of a processing target.

(Step S59) The risk degree calculation part 1220 identifies a record that is corresponded to an identifier of a storage level pool of a processing target of the storage level pool information table 1100, and determines whether or not a risk degree 1109 of the record is "Danger" or "Caution". As a result, in the case where a risk, degree 1109 of the record is "Danger" or "Caution" (step S59: YES), the risk degree calculation part 1220 goes ahead with the processing to the step S60. On the other hand, in the case where a risk degree 1109 of the record is not "Danger" or "Caution" (step S59: NO), the risk degree calculation part 1220 goes ahead with the processing to the step S51.

(Step S60) The risk degree calculation part 1220 adds a record that is corresponded to a storage level pool of a processing target to the virtual server risk degree table 2100. More specifically, the risk degree calculation part 1220 configures an identifier of a virtual server that is a processing target in the step S52 to the virtual server identifier 2101, configures an identifier of the storage level pool that has been selected in the step S58 to the cause region 2102, and adds a record in which a value of the risk degree 1109 that has been determined in the step S59 has been configured to the risk degree 2103 to the virtual server risk degree table 2100.

(Step S61) The risk degree calculation part 1220 determines whether or not a processing for all the storage level pools that have been identified in the step S57 has been completed. As a result, in the case where a processing for all the storage level pools that have been identified has not been completed (step S61: NO), the risk degree calculation part 1220 goes ahead with the processing to the step S58. On the other hand, in the case where a processing for all the storage level pools that have been identified has been completed (step S61: YES), the risk degree calculation part 1220 goes ahead with the processing to the step S62.

(Step S62) The risk degree calculation part 1220 determines whether or not a processing for all the server level pools that have been identified in the step S57 has been completed. As a result, in the case where a processing for all the server level pools that have been identified has not been completed (step S62: NO), the risk degree calculation part 1220 goes ahead with the processing to the step S54. On the other hand, in the case where a processing for all the server level pools that have been identified has been completed (step S62: YES), the risk degree calculation part 1220 goes ahead with the processing to the step S63.

(Step S63) The risk degree calculation part 1220 decides a risk degree of the virtual server based on a record that is corresponded to the virtual server that has been selected in the step S52. More specifically, in the case where there are one or more records that are corresponded to the virtual server that has been selected in the virtual server risk degree table 2100, the risk degree calculation part 1220 decides a high risk degree in the risk degree 2103 of the record as a risk degree to the virtual server. For instance, in the case where there is "Danger" or "Caution" as the risk degree 2103 that is corresponded to a certain virtual server, the risk degree calculation part 1220 decides "Danger". On the other hand, in the case where there is no record that is corresponded to the virtual server that has been selected in the virtual server risk degree table 2100, the risk degree calculation part 1220 decides a risk degree to the virtual server as "Safe". In the next place, the risk degree calculation part 1220 configures a priority that has been decided to a risk degree 2203 of a record of the virtual server of the virtual server information table 2200.

(Step S64) The risk degree calculation part 1220 determines whether or not a processing for all the virtual servers that have been identified in the step S51 has been completed. As a result, in the case where a processing for all the virtual servers that have been identified has not been completed (step S64: NO), the risk degree calculation part 1220 goes ahead with the processing to the step S52. On the other hand, in the case where a processing for all the virtual servers that have been identified has been completed (step S64: YES), the risk degree calculation part 1220 terminates the processing.

According to this processing, a risk degree for each virtual server can be determined in an appropriate manner.

The risk degree calculation processing for the VM1, the VM2, and the VM3 in the case where the computer system is in the status that is shown in FIG. 28 will be described in detail.

Since the VM1 belongs to the HLP1 and the LLP, the HLP1 is "Danger", and the LLP is "Safe", a risk degree of the VM1 is determined as "Danger". Since the VM2 belongs to the HLP1 and the LLP, the HLP1 is "Danger", and the LLP is "Safe", a risk degree of the VM2 is determined as "Danger". Since the VM3 belongs to the HLP2 and the LLP, the HLP2 is "Safe", and the LLP is "Safe", a risk degree of the VM3 is determined as "Safe".

In the next place, a display processing for displaying a risk degree of the storage level pool and the server level pool will be described.

The display processing is executed by the risk degree calculation part 1220 based on an instruction of a manager to the input/output device 160 for the management server 100 for instance.

The risk degree calculation part 1220 refers to the server level pool information table 1300, identifies all records in which a risk degree 1310 is "Caution" or "Danger", acquires the server level pool identifier 1301, the risk degree 1310, and the influence degree 1311 of the record, refers to the storage level pool information table 1100, identifies all records in which a risk degree 1109 is "Caution" or "Danger", acquires the server level pool identifier 1101, the risk degree 1109, and the influence degree 1110 of the record, and displays a display screen that is shown in FIG. 15 or the like based on the information that has been acquired.

FIG. 15 is a view showing an example of a display screen for displaying a risk degree of a storage level pool and a server level pool.

In this display screen, an identifier, a risk degree, and an influence degree for a server level pool are displayed, and an identifier, a risk degree, and an influence degree for a storage level pool are displayed. By this display screen, a manager can comprehend a server level pool and a storage level pool that is provided with a high risk degree in an appropriate manner. Moreover, a manager can comprehend a degree of an influence caused by a depletion of a free capacity of the server level pool or a storage level pool in an appropriate manner.

In the next place, for a virtual server in which a risk degree is determined as high (for instance, "Danger"), the following describes an improvement point selection processing for identifying a region that is a cause in which the virtual server is determined as "Danger" tan improvement point) and a coping execution availability determination processing for determining a coping measure that is executable for an improvement point that has been identified.

An improvement point selection processing will be described. The improvement point selection processing is executed by the cause/improvement point selection part 1230.

The cause/improvement point selection part 1230 refers to the virtual server information table 2200 and identifies a virtual server identifier in which a risk degree 2203 is "Danger" or "Caution". In the next place, the cause/improvement point selection part 1230 refers to the virtual server risk degree table 2100, acquires all records that are corresponded to an identifier of the virtual server that has been identified, and configures a cause region 2102 of the records as an improvement point.

In the next place, a coping execution availability determination processing will be described.

Figure 16:
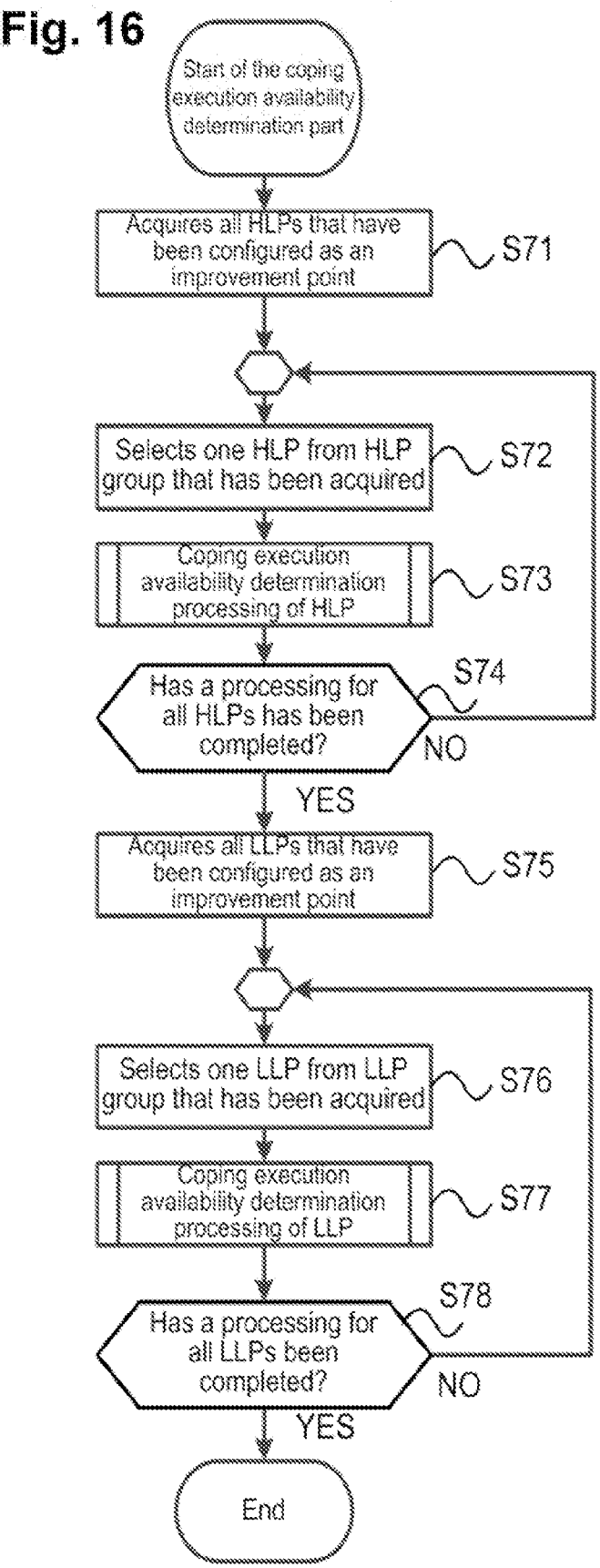
FIG. 16 is a flowchart of a coping execution availability determination processing.

FIG. 16 is a flowchart of a coping execution availability determination processing.

The coping execution availability determination processing is executed by the coping execution availability determination part 1240 after the improvement point selection processing is executed for instance.

(Step S71) The coping execution availability determination part 1240 acquires an identifier of all server level pools that have been configured as an improvement point for the improvement point selection processing.

(Step S72) The coping execution availability determination part 1240 selects one of the identifiers of the server level pools that have been acquired as a identifier of a server level pool of a processing target.

Figure 17:
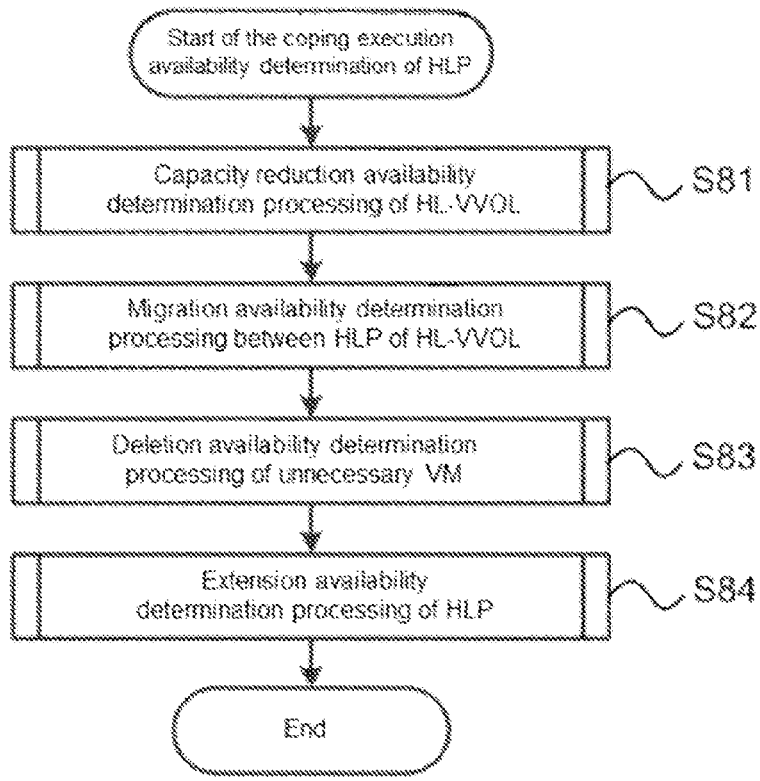
FIG. 17 is a flowchart of a coping execution availability determination processing of an HLP.

(Step S73) The coping execution availability determination part 1240 executes a coping execution availability determination processing of an HLP that is shown in FIG. 17 for a server level pool of a processing target. By the coping execution availability determination processing of an HLP, a coping measure that is executable to a server level pool of a processing target is detected.

(Step S74) The coping execution availability determination part 1240 determines whether or not a processing for all the server level pools that have been acquired in the step S71 has been completed. As a result, in the case where a processing for all the server level pools that have been identified has not been completed (step S74: NO), the coping execution availability determination part 1240 goes ahead with the processing to the step S72. On the other hand, in the case where a processing for all the server level pools that have been identified has been completed (step S74: YES), the coping execution availability determination part 1240 goes ahead with the processing to the step S75.

(Step S75) The coping execution availability determination part 1240 acquires an identifier of all storage level pools that have been configured as an improvement, point for the improvement point selection processing.

(Step S76) The coping execution availability determination part 1240 selects one of the identifiers of the storage level pools that have been acquired as a identifier of as storage level pool of a processing target.

Figure 18:
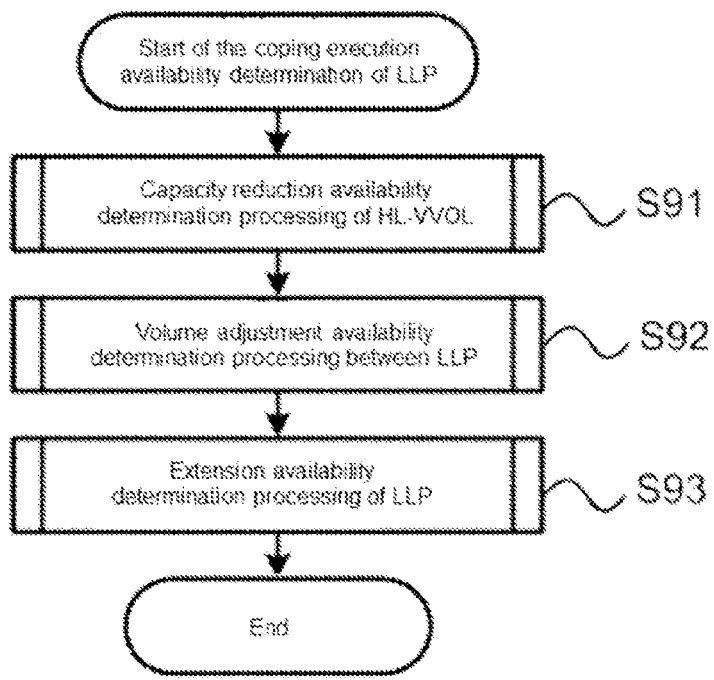
FIG. 18 is a flowchart of a coping execution availability determination processing of an LLP.

(Step S77) The coping execution availability determination part 1240 executes a coping execution availability determination processing of an LLP that is shown in FIG. 18 for a storage level pool of a processing target. By the coping execution availability determination processing of an LLP, a coping measure that is executable to a storage level pool of a processing target is detected.

(Step S78) The coping execution availability determination part 1240 determines whether or not a processing for all the storage level pools that have been acquired in the step S75 has been completed. As a result, in the case where a processing for all the storage level pools that have been identified has not been completed (step S78: NO), the coping execution availability determination part 1240 goes ahead with the processing to the step S76. On the other hand, in the case where a processing for all the storage level pools that have been identified has been completed (step S78: YES), the coping execution availability determination part 1240 terminates the processing.

FIG. 17 is a flowchart of a coping execution availability determination processing of an HLP.

A coping execution availability determination processing of an HLP is a processing that is corresponded to the step S73 of the coping execution availability determination processing of an HLP of FIG. 16. A coping measure to as server level pool is not restricted to the coping measure that is described in the following, and can be a coping measure in which a risk degree for a server level pool can be reduced.

Figure 19:
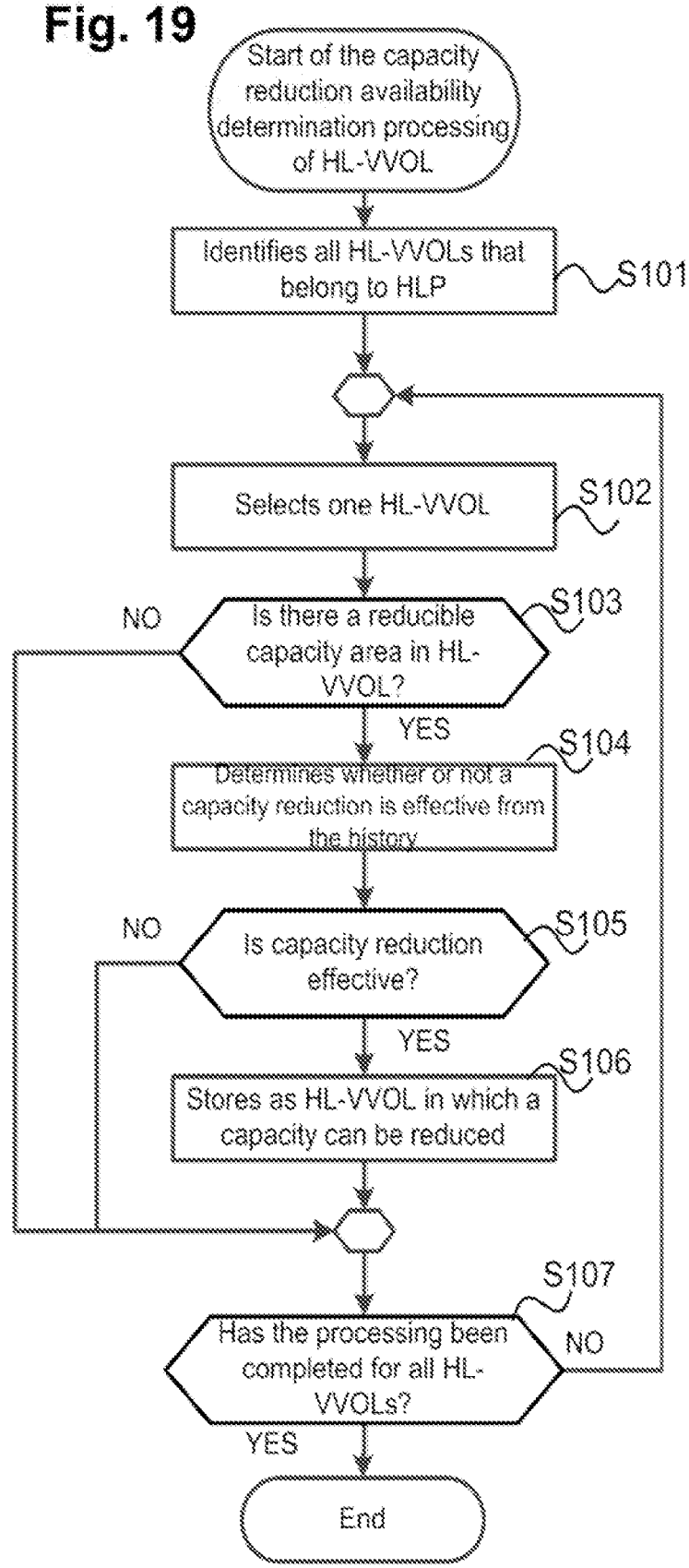
FIG. 19 is a flowchart of an HL-VVOL capacity reduction availability determination processing for an HLP.

(Step S81) The coping execution availability determination part 1240 executes a capacity reduction availability determination processing of a server level virtual volume that is shown in FIG. 19 for a server level pool of a processing target. By the capacity reduction availability determination processing of a server level virtual volume, whether or not a capacity reduction of a server level virtual volume can be executed as a coping measure is determined.

Figure 22:
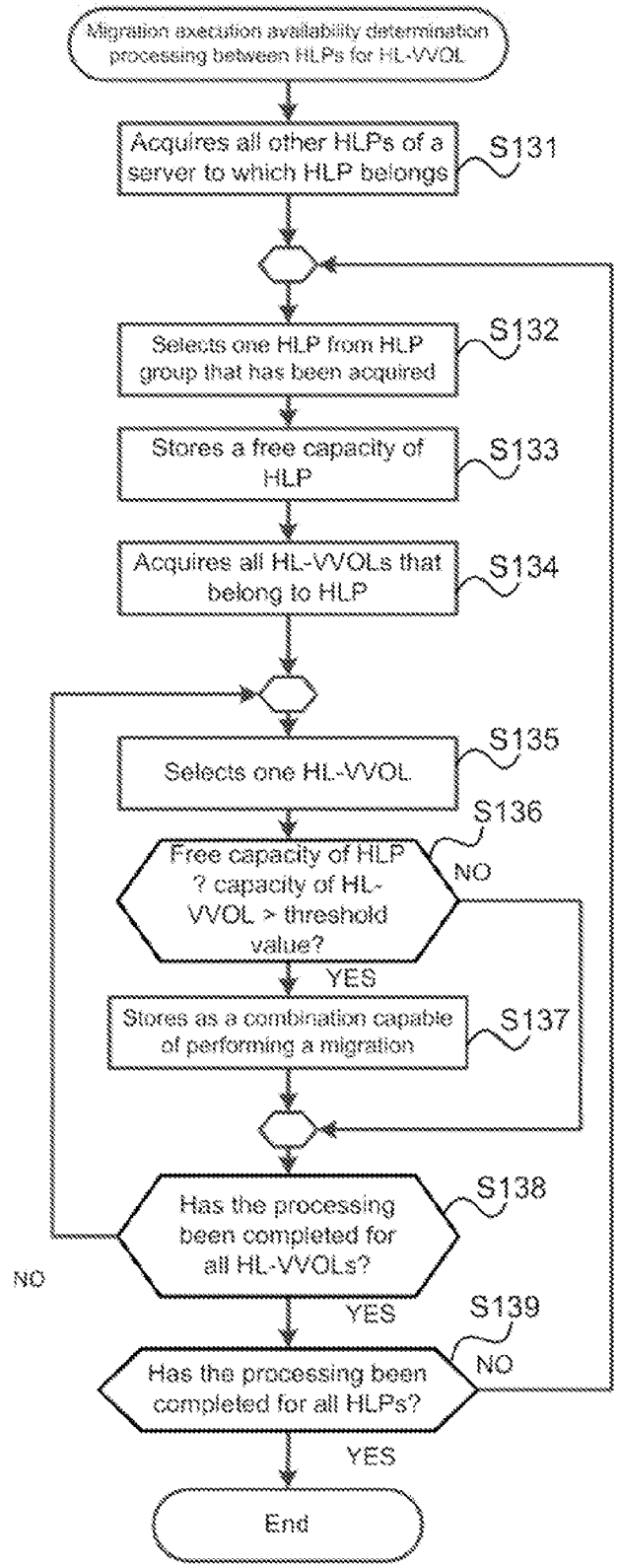
FIG. 22 is a flowchart of a migration execution availability determination processing between HLPs.

(Step S82) The coping execution availability determination part 1240 executes a migration availability determination processing between server level pools of a server level virtual volume that is shown in FIG. 22 for a server level pool of a processing target. By the migration availability determination processing between server level pools of a server level virtual volume, whether or not a migration between server level pools of a server level virtual volume can be executed as a coping measure is determined.

Figure 21:
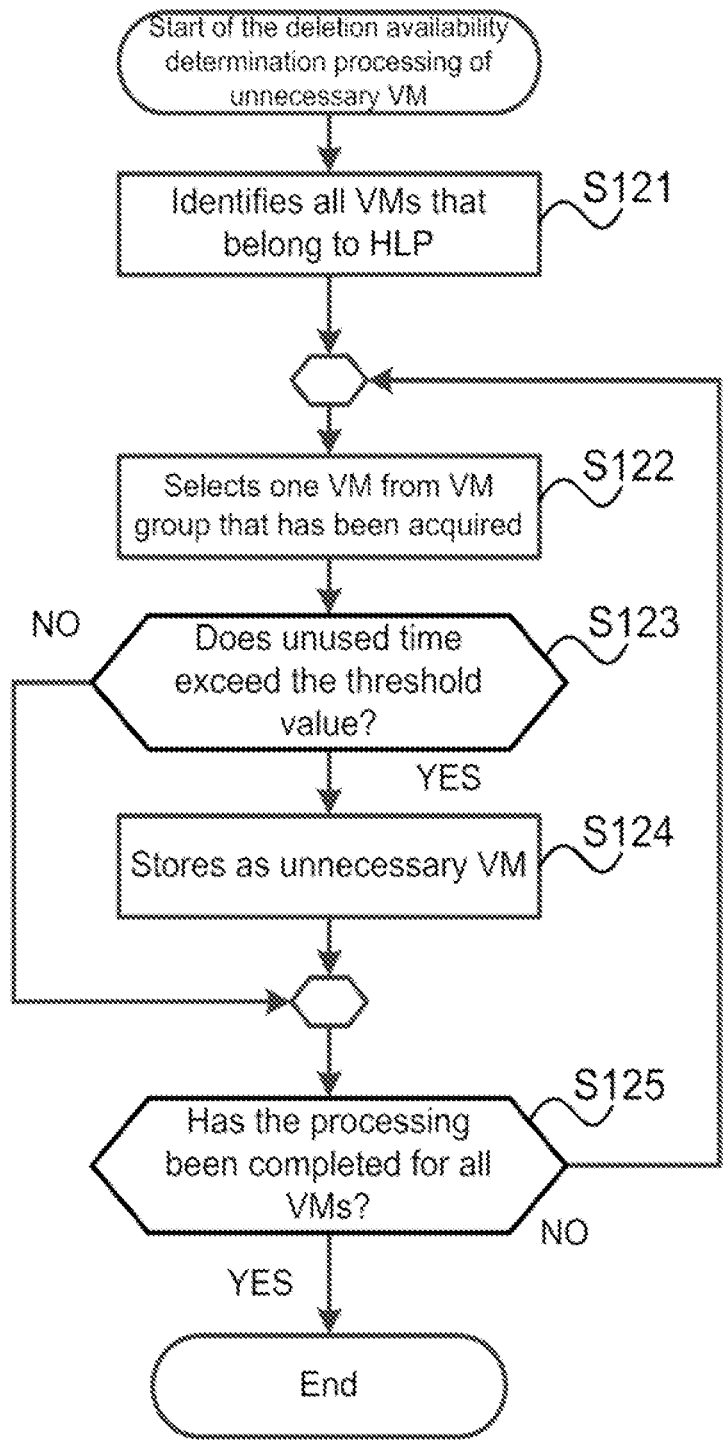
FIG. 21 is a flowchart of an unnecessary VM deletion availability determination processing.

(Step S83) The coping execution availability determination part 1240 executes a deletion availability determination processing of an unnecessary virtual server that is shown in FIG. 21 for a server level pool of a processing target. By the deletion availability determination processing of an unnecessary virtual server, whether or not a deletion of an unnecessary virtual server can be executed as a coping measure is determined.

Figure 20:
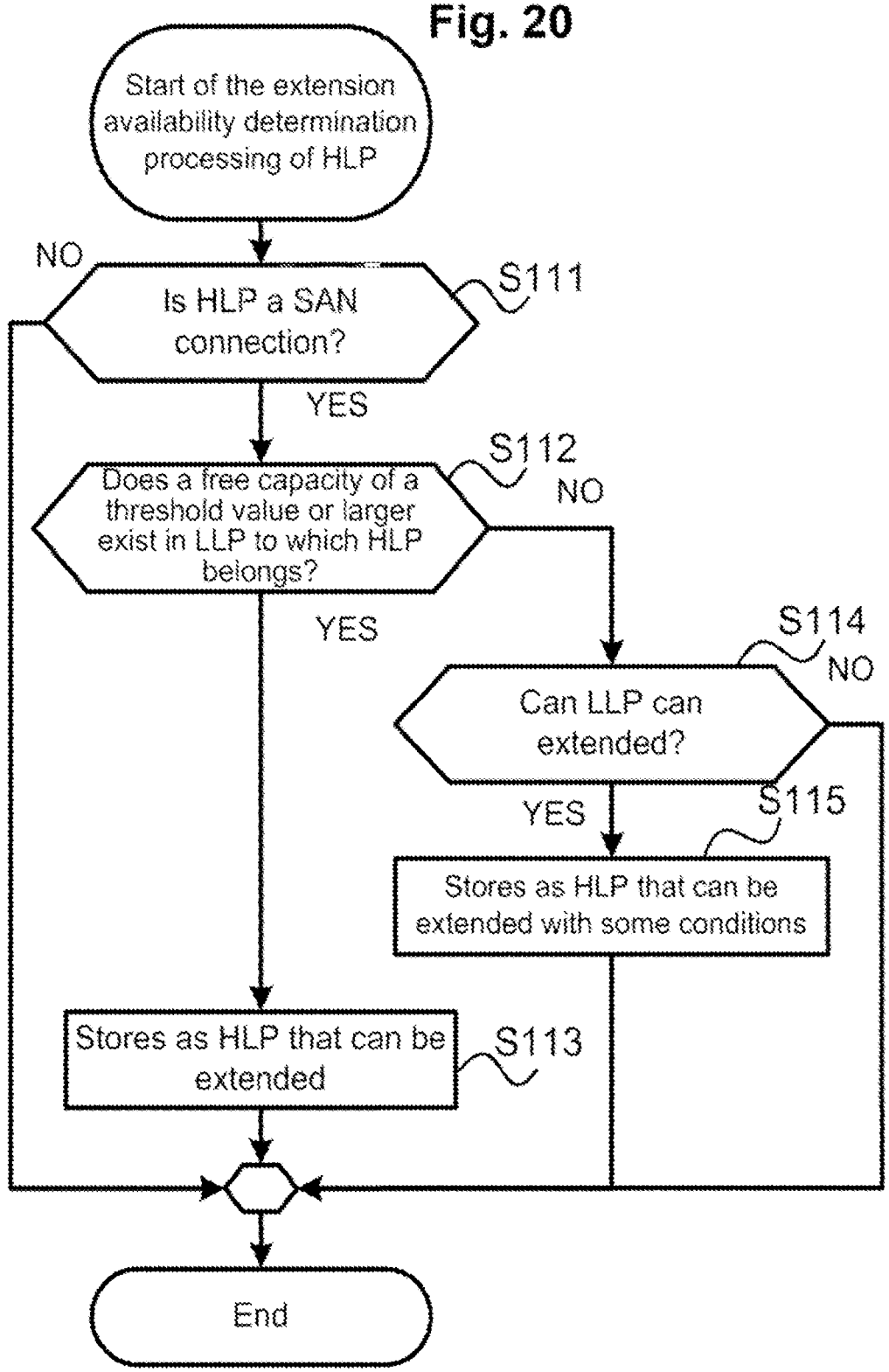
FIG. 20 is a flowchart of an extension availability determination processing of an HLP.

(Step S84) The coping execution availability determination part 1240 executes an extension availability determination processing of a server level pool that is shown in FIG. 20 for a server level pool of a processing target. By the extension availability determination processing of a server level pool, whether or not an extension of a server level pool can be executed as a coping measure is determined.

According to the coping execution availability determination processing of an HLP, a coping measure that is executable to a server level pool of a processing target is detected.

FIG. 18 is a flowchart of a coping execution availability determination processing of an LLP.

A coping execution availability determination processing of an LLP is a processing that is corresponded to the step S77 of the coping execution availability determination processing of FIG. 16. A coping measure to a storage level pool is not restricted to the coping measure that is described in the following, and can be a coping measure in which a risk degree for a storage level pool can be reduced.

Figure 23:
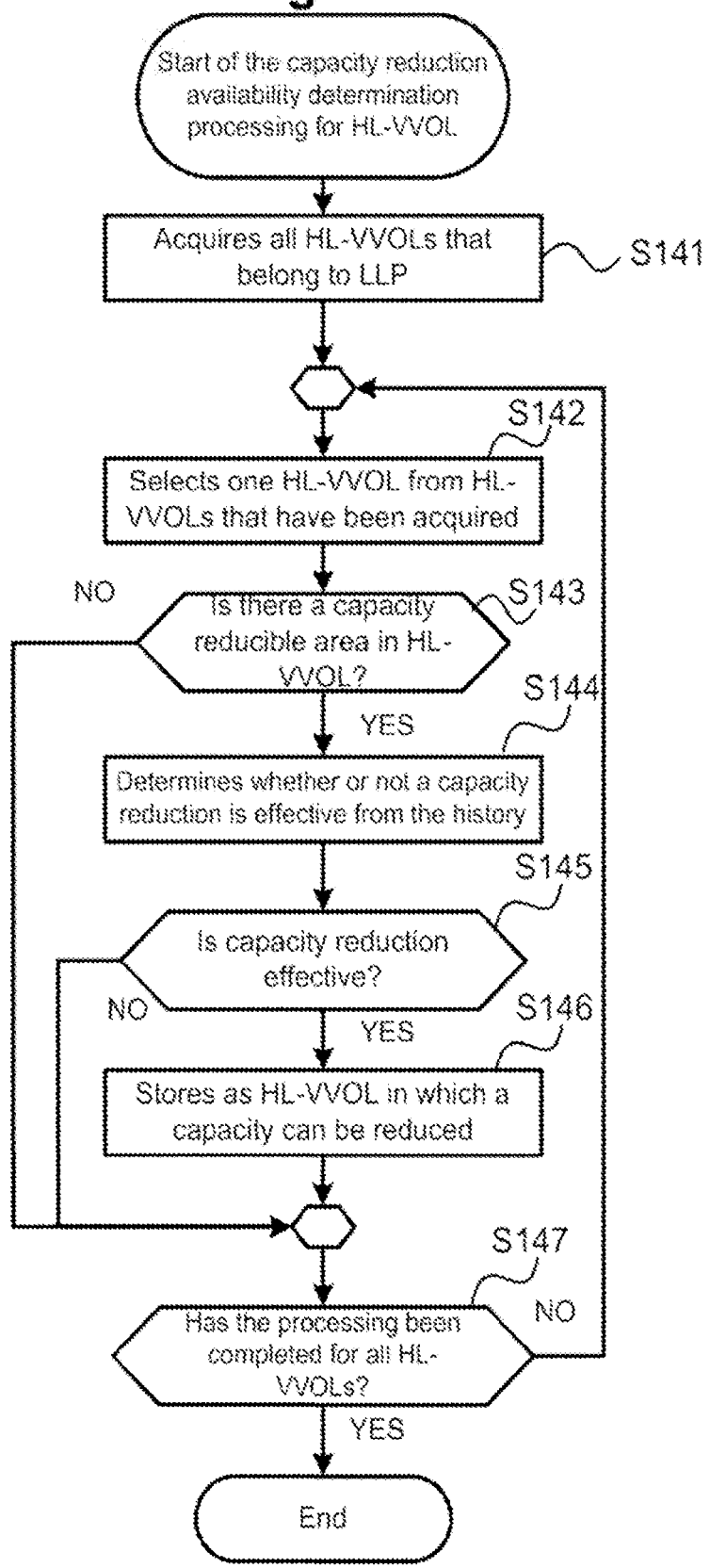
FIG. 23 is a flowchart of an HL-VVOL capacity reduction availability determination processing for an LLP.

(Step S91) the coping execution availability determination part 1240 executes a capacity reduction availability determination processing of a server level virtual volume that is shown in FIG. 23 for a storage level pool of a processing target. By the capacity reduction availability determination processing of a server level virtual volume, whether or not a capacity reduction of a server level virtual volume can be executed as a coping measure is determined.

Figure 25:
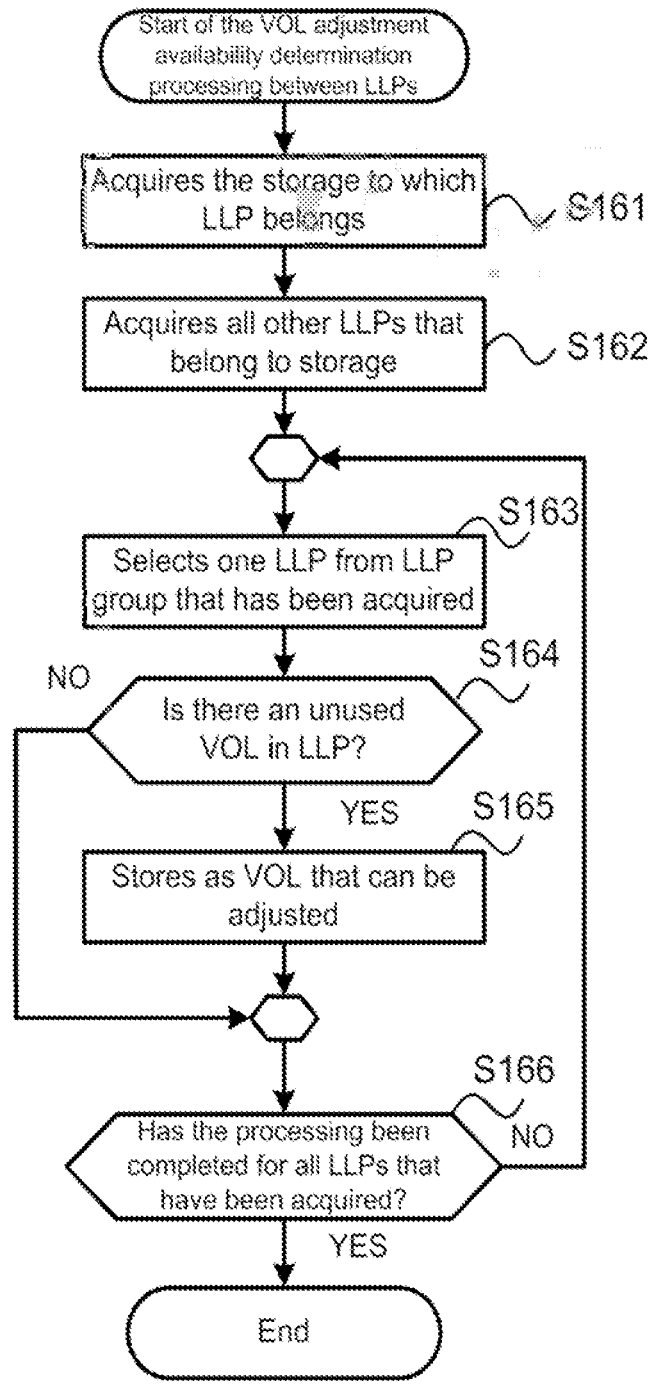
FIG. 25 is a flowchart of a VOL adjustment availability determination processing between LLPs.

(Step S92) The coping execution availability determination part 1240 executes a volume adjustment availability determination processing between storage level pools that is shown in FIG. 25 for a storage level pool of a processing target. By the volume adjustment availability determination processing between storage level pools, whether or not an adjustment of a volume between storage level pools can be executed as a coping measure is determined.

Figure 24:
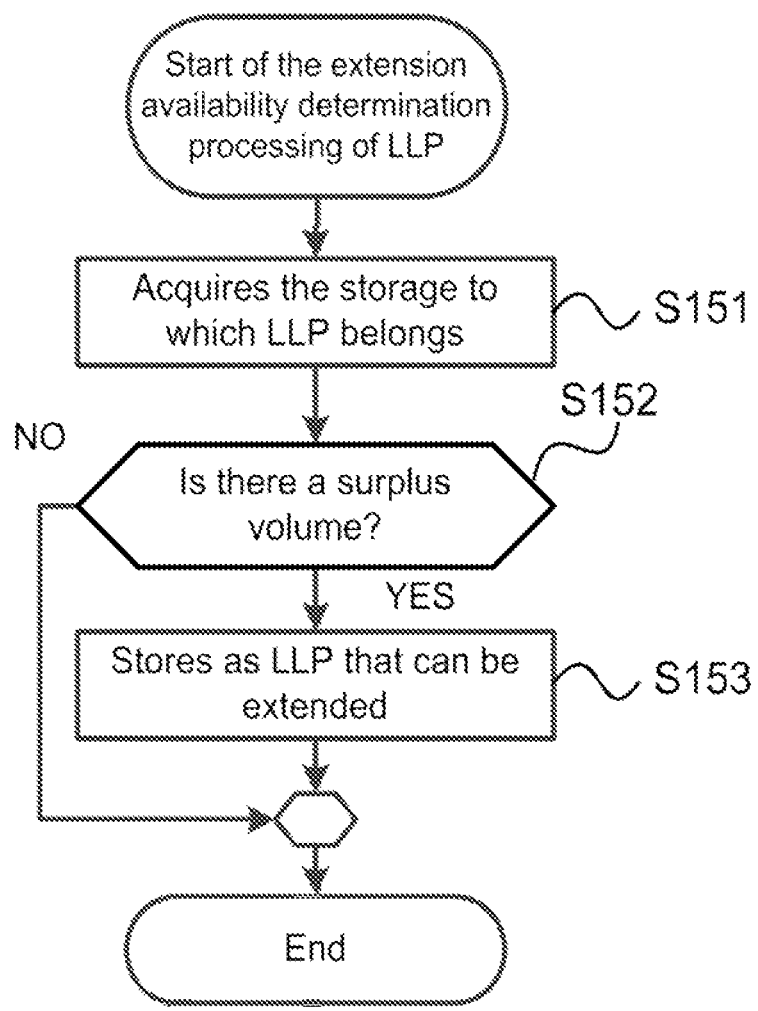
FIG. 24 is a flowchart of an extension availability determination processing of an LLP.

(Step S93) The coping execution availability determination part 1240 executes an extension availability determination processing of a storage level pool that is shown in FIG. 24 for a storage level pool of a processing target. By the extension availability determination processing of a storage level pool, whether or not an extension of a storage level pool can be executed as a coping measure is determined.

FIG. 19 is a flowchart of an HL-VVOL capacity reduction availability determination processing for an HLP. An HL-VVOL capacity reduction availability determination processing for an HLP is a processing that is corresponded to the step S81 of the coping execution availability determination processing of a server level pool of FIG. 17.

(Step S101) The coping execution availability determination part 1240 identifies an identifier of all storage level virtual volumes that belong to the server level pool of a processing target. More specifically, the coping execution availability determination part 1240 refers to the server level virtual volume information table 1400, and identifies a server level virtual volume identifier 1401 of all records in which the server level pool identifier 1405 is the server level pool identifier of a processing target.

(Step S102) The coping execution availability determination part 1240 selects one of the server level virtual volume identifiers that have been acquired as a server level virtual volume of a processing target.

(Step S103) The coping execution availability determination part 1240 determines whether or not there is a reducible capacity in the server level virtual volume that has been selected. More specifically, the coping execution availability determination part 1240 determines whether or not a capacity exists in a reducible capacity 1400 of the server level virtual volume information table 1400. As a result, in the case where a reducible capacity exists (step S103: YES), the coping execution availability determination part 1240 goes ahead with the processing to the step S104. On the other hand, in the case where a reducible capacity does not exist (step S103: NO), the coping execution availability determination part 1240 goes ahead with the processing to the step S107.

(Step S104) The coping execution availability determination part 1240 refers to the history and determines whether or not a capacity reduction of the server level virtual volume is effective. Here, in the case where a temporary file is created in large quantity in a batch processing for a virtual server that executes a nighttime batch processing and the files are deleted after the batch processing for instance, since a size of the server level virtual volume is increased every when the batch processing is executed, it is determined that a capacity reduction of the server level virtual volume is not effective.

(Step S105) The coping execution availability determination part 1240 determines whether or not a capacity reduction of the server level virtual volume is effective based on the determination of the step S104. As a result, in the case where a capacity reduction of the server level virtual volume is effective (step S105: YES), the coping execution availability determination part 1240 goes ahead with the processing to the step S106. On the other hand, in the case where a capacity reduction of the server level virtual volume is not effective (step S105: NO), the coping execution availability determination part 1240 goes ahead with the processing to the step S107.

(Step S106) The coping execution availability determination part 1240 stores an identifier of a server level virtual volume of a processing target as an identifier of a server level virtual volume in which a capacity can be reduced into the memory 110.

(Step S107) The coping execution availability determination part 1240 determines whether or not the processing has been completed for all the server level virtual volumes that have been acquired in the step S101. As a result, in the case where the processing has not been completed for all the server level virtual volumes that have been identified (step S107: NO), the coping execution availability determination part 1240 goes ahead with the processing to the step S102. On the other hand, in the case where the processing has been completed for all the server level virtual volumes that have been identified (step S107: YES), the coping execution availability determination part 1240 terminates the processing.

According to the HL-VVOL capacity reduction availability determination processing for an HLP, a server level virtual volume in which a capacity can be reduced can be detected in an appropriate manner.

The HL-VVOL capacity reduction availability determination processing for an HLP in the case where the computer system is in the status that is shown in FIG. 28 will be described in detail.

Since a file size of the HL-VVOL1 (VHD1) is 70 GB and a capacity that is used for the VM1 on the HL-VVOL1 is 40 GB, it is thought that a useless capacity of 30 GB can be reduced by a capacity reduction of the HL-VVOL1. On the other hand, since a file size of the HL-VVOL2 (VHD2) is 20 GB and a capacity that is used for the VM2 on the HL-VVOL2 is 20 GB, it is thought that a capacity reduction of the HL-VVOL2 is not effective. Consequently, according to the HL-VVOL capacity reduction availability determination processing for an HLP, it is determined that a capacity reduction of 30 GB is possible for the HL-VVOL1 by a capacity reduction processing.

FIG. 20 is a flowchart, of an extension availability determination processing of an HLP. An extension availability determination processing of an HLP is a processing that is corresponded to the step S84 of the coping execution availability determination processing of a server level pool that is shown in FIG. 17.

(Step S111) The coping execution availability determination part 1240 determines whether or not a server level pool of a processing target is to SAN connection. Whether or not a server level pool is a SAN connection can be identified by referring to a connection method 1308 of a record that is associated with a server level pool of a processing target of the server level pool information table 1300. As a result, in the case where a server level pool is a SAN connection (step S111: YES), the coping execution availability determination part 1240 goes ahead with the processing to the step S112. On the other hand, in the case were a server level pool is not a SAN connection (step S111: NO), that is, in the case where a server level pool is an internal HDD, since it can be determined that an extension is impossible, the coping execution availability determination part 1240 terminates the processing.

(Step S112) The coping execution availability determination part 1240 determines whether or not a free capacity of a predetermined threshold value or larger exists in a storage level pool to which a server level pool of a processing target belongs. More specifically, the coping execution availability determination part 1240 refers to the server level pool information table 1300, the storage level virtual volume information, table 1200, and the storage level pool information table 1100, identifies a storage level pool to which a server level pool of a processing target belongs, identifies a free capacity of the storage level pool, and determines whether or not the free capacity of the storage level pool is equal to or larger than a predetermined threshold value. The threshold value can be defined by a manager, or can be defined in the system in advance. As a result, in the case where a free capacity of a predetermined threshold value or larger exists (step S112: YES), the coping execution availability determination part 1240 goes ahead with the processing to the step S113. On the other hand, in the case where a free capacity of a predetermined threshold value or larger does not exist (step S112: NO), the coping execution availability determination part 1240 goes ahead with the processing to the step S114.

(Step S113) The coping execution availability determination part 1240 stores an identifier of a server level pool of a processing target as an identifier of a server level pool that can be extended. More specifically, the coping execution availability determination part 1240 adds a record to the server level virtual volume extension table 1700, makes the improvement point 1701 to be an identifier of a server level pool of a processing target, and makes an extensibility 1702 to be "extensible".

(Step S114) The coping execution availability determination part 1240 determines whether or not a storage level pool to which a server level pool of a processing target belongs can be extended. The determination processing for determining whether or not a storage level pool can be extended is illustrated in FIG. 24. As a result, in the case where a storage level pool can he extended (step S114: YES), the coping execution availability determination part 1240 goes ahead with the processing to the step S115. On the other hand, in the case where a storage level pool cannot be extended (step S114: NO), the coping execution availability determination part 1240 terminates the processing.

(Step S115) The coping execution availability determination part 1240 stores an identifier of a server level pool of a processing target into the memory 110 as an identifier of a server level pool that can be extended with some conditions. More specifically the coping execution availability determination part 1240 adds a record to the server level virtual volume extension table 1700, makes the improvement point 1701 to be an identifier of a server level pool of a processing target, makes an extensibility 1702 to be "extension of LPP is necessary", and makes the LLP identifier 1702 to be an identifier of a storage level pool that has been determined as extensible.

By the extension availability determination processing of a server level pool, a server level pool that can be extended is detected.

The extension availability determination processing of a server level pool in the case where the computer system is in the status that is shown in FIG. 28 will be described in detail.

Since the HLP1 is connected to the LLP by the SAN and a physical free capacity exists in the LLP, it is determined that the HLP1 can be extended.

FIG. 21 is a flowchart of an unnecessary VM deletion availability determination processing. An unnecessary VM deletion availability determination processing is a processing that is corresponded to the step S83 of the coping execution availability determination processing of a server level pool that is shown in FIG. 17.

(Step S121) The coping execution availability determination part 1240 identifies an identifier of all virtual servers that belong to the server level pool of a processing target. More specifically, the coping execution availability determination part 1240 refers to the server level virtual volume information table 1400 and the virtual server level file system information table 1500, and identifies all the virtual server identifiers that are corresponded to the server level pool identifier of a processing target.

(Step S122) The coping execution availability determination part 1240 selects one of the virtual server identifiers that have been identified as an identifier of a virtual server of a processing target.

(Step S123) The coping execution availability determination part 1240 determines whether or not an unused time of a virtual server that has been selected exceeds a predetermined threshold value. More specifically, the coping execution availability determination part 1240 calculates an unused time from the last use data and time 2202 of a record that is corresponded to an identifier of a virtual server that has been selected for the virtual server information table 2200 and the present data and time, and compares the unused time with the threshold value. As a result, in the case where an unused time exceeds a predetermined threshold value (step S123: YES), the coping execution availability determination part 1240 goes ahead with the processing to the step S124. On the other hand, in the case where an unused time does not exceed a predetermined threshold value (step S123: NO), the coping execution availability determination part 1240 goes ahead with the processing to the step S125.

(Step S124) The coping execution availability determination part 1240 stores an identifier of a virtual server of a processing target into the memory 110 as an identifier of an unnecessary virtual server. More specifically, the coping execution availability determination part 1240 adds a record to the unnecessary virtual server table 1600, makes the improvement point 1601 to be an identifier of a server level pool of a processing target, makes the unnecessary virtual server identifier 1602 to be an identifier of a virtual server of a processing target, and makes the reducible capacity 1603 to be a used capacity of a virtual server of a processing target.

(Step S125) The coping execution availability determination part 1240 determines whether or not the processing has been completed for all the virtual servers that have been acquired in the step S121. As a result, in the case where the processing has not been completed for all the virtual servers that have been identified (step S125: NO), the coping execution availability determination part 1240 goes ahead with the processing to the step S122. On the other hand, in the case where the processing has been completed for all the virtual servers that have been identified (step S125: YES), the coping execution availability determination part 1240 terminates the processing.

By the deletion availability determination processing of an unnecessary virtual server, an unnecessary virtual server can be detected.

FIG. 22 is a flowchart of a migration execution availability determination processing between HLPs. A migration execution availability determination processing between HLPs is a processing that is corresponded to the step S82 of the coping execution availability determination, processing of a server level pool that is shown in FIG. 17.

(Step S131) The coping execution availability determination part 1240 identifies an identifier of all other server level pools to which the server level pool of a processing target belongs. More specifically the coping execution availability determination part 1240 refers to the server level pool information table 1300, and identifies the server level pool identifier 1301 of all records that are a physical server identifier 1300 that is equivalent to a corresponded physical server 1309 of a record that is corresponded to the server level pool identifier of a processing target.

(Step S132) The coping execution availability determination part 1240 selects one of the server level pool identifier 1301 that has been identified as an identifier of a server level pool of a processing target.

(Step S133) The coping execution availability determination part 1240 refers to the server level pool information table 1300, identifies a free capacity of a server level pool of a processing target, and stores it into the memory 110.

(Step S134) The coping execution availability determination part 1240 refers to the server level virtual volume information table 1400, and acquires an identifier of all server level virtual volumes that belong to the server level pool of a processing target.

(Step S135) The coping execution availability determination part 1240 selects One of the server level virtual volume that has been identified as an identifier of a server level virtual volume of a processing target.

(Step S136) The coping execution availability determination part 1240 subtracts a capacity of a server level virtual volume from a free capacity of a server level pool, and determines whether or not the subtraction result is larger than a threshold value. As a result, in the case where the subtraction result is larger than a threshold value (step S136: YES), the coping execution availability determination part 1240 goes ahead with the processing to the step S137. On the other hand, in the case where the subtraction result is not larger than a threshold value (step S136: NO), the coping execution availability determination part 1240 goes ahead with the processing to the step S138.

(Step S137) The coping execution availability determination part 1240 stores an identifier of a server level pool of a processing target and an identifier of a server level virtual volume of a processing target into the memory 110 as a combination capable of performing a migration. More specifically, the coping execution availability determination part 1240 adds a record to the migration table 1900, makes the improvement point 1901 to be an identifier of a server level pool of a processing target, makes the migration destination server level pool identifier 1902 to be an identifier of a server level pool that has been selected in the step S132, makes the target server level virtual volume 1903 to be a server level virtual volume of a processing target, and makes the target server level virtual volume capacity 1904 to be a capacity of a server level virtual volume of a processing target.

(Step S138) The coping execution availability determination part 1240 determines whether or not the processing has been completed for all the server level virtual volumes that have been acquired in the step S134. As a result, in the case where the processing has not been completed for all the server level virtual volumes that have been identified (step S138: NO), the coping execution availability determination part 1240 goes ahead with the processing to the step S135. On the other hand, in the case where the processing has been completed for all, the server level virtual volumes that have been identified (step S138: YES), the coping execution availability determination part 1240 goes ahead with the processing to the step S139.

(Step S139) The coping execution availability determination part 1240 determines whether or not the processing has been completed for all the server level pools that have been acquired in the step S131. As a result, in the case where the processing has not been completed for all the server level pools that have been identified (step S139: NO), the coping execution availability determination part 1240 goes ahead with the processing to the step S132. On the other hand, in the case where the processing has been completed for all the server level pools that have been identified (step S139: YES), the coping execution avail ability determination part 1240 terminates the processing.

By the migration execution availability determination processing between HLPs, a server level virtual volume capable of performing a migration can be detected.

The migration execution availability determination processing between HLPs in the case where the computer system is in the status that is shown in FIG. 28 will be described in detail.

Another pool that is the HLP2 exists on a physical server that is equivalent to the HLP1. For the HLP2, only 10 GB is used to the total capacity of 100 GB. Consequently, it is determined that a migration is possible for both of the HL-VVOL1 of which a file size is 70 GB and the HL-VVOL2 of which a file size is 20 GB.

FIG. 23 is a flowchart of an HL-VVOL capacity reduction availability determination processing for an LLP. An HL-VVOL capacity reduction availability determination processing for an LLP is a processing that is corresponded to the step S91 of the coping execution availability determination processing of a storage level pool that is shown in FIG. 18.

(Step S141) The coping execution availability determination part 1240 identifies an identifier of all server level virtual volumes that belong to the storage level pool of a processing target. More specifically, the coping execution availability determination part 1240 refers to the storage level pool information table 1100 the storage level virtual volume information table 1200, the server level pool information table 1300, and the server level virtual volume information table 1400, and identifies all the server level virtual volume identifiers that are corresponded to the storage level pool identifier.

(Step S142) The coping execution availability determination part 1240 selects one of the server level virtual volume identifiers that have been acquired as an identifier of a server level virtual volume of a processing target.

(Step S143) The coping execution availability determination part 1240 determines whether or not there is a reducible capacity in the server level virtual volume that has been selected. More specifically, the coping execution availability determination part 1240 determines whether or not a capacity exists in a reducible capacity 1406 of the server level virtual volume information table 1400. As a result, in the case where a reducible capacity exists (step S143: YES), the coping execution availability determination part 1240 goes ahead with the processing to the step S144. On the other hand, in the case where a reducible capacity does not exist (step S143: NO), the coping execution availability determination part 1240 goes ahead with the processing to the step S147.

(Step S144) The coping execution availability determination part 1240 refers to the history for the server level virtual volume and determines whether or not a capacity reduction of the server level virtual volume is effective. Here, in the case where a temporary file is created in large quantity hi a batch processing for a virtual server that executes a nighttime batch processing and the files are deleted after the batch processing for instance, since a size of the server level virtual volume is increased every when the batch processing is executed, it is determined that a capacity reduction of the server level virtual volume is not effective.

(Step S145) The coping execution availability determination part 1240 determines whether or not a capacity reduction of the server level virtual volume is effective based on the determination of the step S144. As a result, in the case where a capacity reduction of the server level virtual volume is effective (step S145: YES), the coping execution avail ability determination part 1240 goes ahead with the processing to the step S146. On the other hand, in the case where a capacity reduction of the server level virtual volume is not effective (step S145: NO), the coping execution availability determination part 1240 goes ahead with the processing to the step S147.

(Step S146) The coping execution availability determination part 1240 stores an identifier of a server level virtual volume of a processing target as an identifier of a server level virtual volume in which a capacity can be reduced into the memory 110.

(Step S147) The coping execution availability determination part 1240 determines whether or not the processing has been completed for all the server level virtual volumes that have been acquired in the step S141. As a result, in the case where the processing has not been completed for all the server level virtual volumes that have, been identified (step S147: NO), the coping execution availability determination part 1240 goes ahead with the processing to the step S142. On the other hand, in the case where the processing has been completed for all, the server level virtual volumes that have been identified (step S147: YES), the coping execution availability determination part 1240 terminates the processing.

According to the HL-VVOL capacity reduction availability determination processing for an LLP, as server level virtual volume that belongs to an LLP in which a capacity can be reduced can be detected in an appropriate manner.

FIG. 24 is a flowchart of an extension availability determination processing of an LLP. An extension avail ability determination processing of an LLP is a processing that is corresponded to the step S93 of the coping execution availability determination processing of a storage level pool that is shown in FIG. 18.

(Step S151) The coping execution availability determination part 1240 refers to the storage level pool information table 1100, and identifies an identifier of the storage system to which the storage level pool of a processing target belongs.

(Step S152) The coping execution availability determination part 1240 refers to the information of the storage system and determines whether or not there is a surplus volume in the storage system. As a result, in the case where there is as surplus volume (step S152: YES), the coping execution availability determination part 1240 goes ahead with the processing to the step S153. On the other hand, in the case where there is not a surplus volume (step S152: NO), since an extension of the storage level pool cannot be executed, the coping execution availability determination part 1240 terminates the processing.

(Step S153) The coping execution availability determination part 1240 stores a storage level pool of a processing target as a storage level pool that can be extended into the memory 110. More specifically, the coping execution availability determination part 1240 adds a record to the storage level pool extension table 1800, makes the improvement paint 1801 to be an identifier of a storage level pool, and makes a maximum extensible capacity 1802 to be a capacity of a surplus volume.

By the extension availability determination processing of an LLP, whether or not an extension of a storage level pool can be executed can be detected in an appropriate manner.

FIG. 25 is a flowchart of a VOL adjustment availability determination processing between LLPs. A VOL adjustment availability determination processing between LLPs is a processing that is corresponded to the step S92 of the coping execution availability determination processing of a storage level pool that is shown in FIG. 18.

(Step S161) The coping execution availability determination part 1240 refers to the storage level pool information table 1100, and identifies an identifier of the storage system to which the storage level pool of a processing target belongs.

(Step S162) The coping execution availability determination part 1240 refers to the storage level pool information table 1100, and acquires an identifier of all other storage level pools that belong to the storage system that has been identified.

(Step S163) The coping execution availability determination part 1240 selects one of the identifiers of the storage level pools that have been acquired AS an identifier of a storage level virtual volume of a processing target.

(Step S164) The coping execution availability determination part 1240 refers to the volume information table 1000 and determines whether or not there is an unused volume in the storage level pool that, has been selected. As a result, in the case where there is an unused volume in the storage level pool that has been selected (step S164: YES), the coping execution availability determination part 1240 goes ahead with the processing to the step S165. On the other hand, in the case where there is not an unused volume in the storage level pool that has been selected (step S164: NO), since an extension of the storage level pool cannot be executed, the coping execution availability determination part 1240 goes ahead with the processing to the step S166.

(Step S165) The coping execution availability determination part 1240 stores an unused volume as a volume that can be adjusted into the memory 110.

(Step S166) The coping execution availability determination part 1240 determines whether or not the processing has been completed for all the storage level pools that have been acquired in the step S162. As a result, in the case where the processing has not been completed for all the storage level pools that have been identified (step S166: NO), the coping execution availability determination part 1240 goes ahead with the processing to the step S163. On the other hand, in the case where the processing has been completed for all the storage level pools that have been identified (step S166: YES), the coping execution availability determination part 1240 terminates the processing.

According to the VOL adjustment availability determination processing between LLPs, a volume that can be adjusted between storage level pools can be detected in an appropriate manner.

In the next place, a coping display processing for displaying a coping measure that has been determined as executable by the coping execution availability determination part 1240 will be described in the following.

The coping display processing is executed in the case where an execution instruction is received from a manager via the input/output device 160 and immediately after a coping execution availability determination processing is executed by the coping execution availability determination part 1240 for instance.

Figure 26:
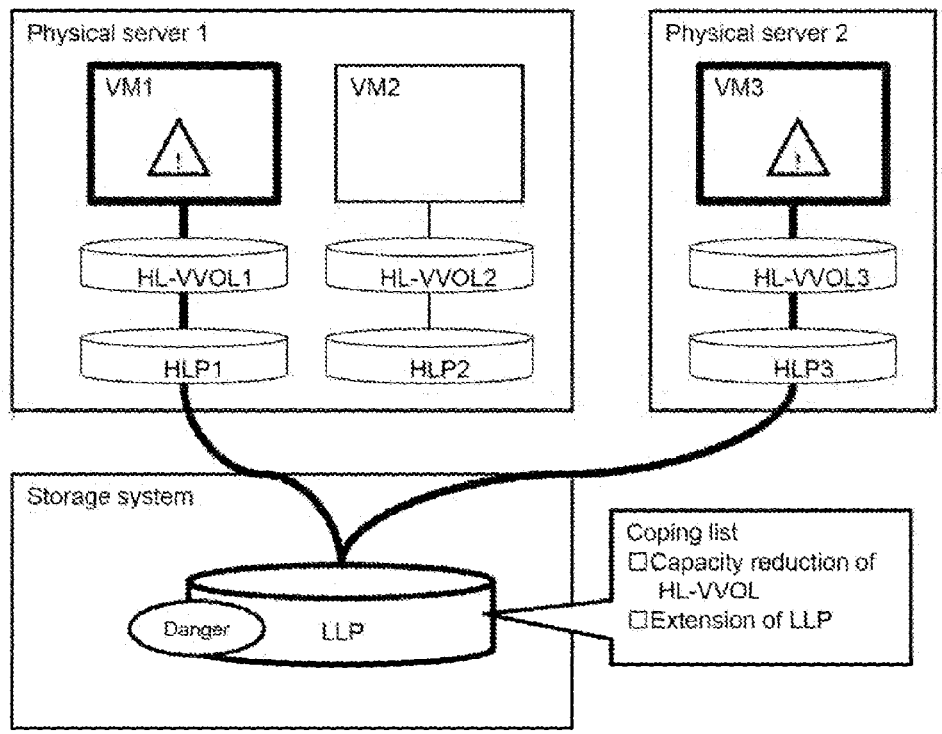
FIG. 26 is a view showing an example of a display screen for displaying an executable coping and a VM risk status.

The coping simulation part 1250 displays a screen that is shown in FIG. 26 and that indicates a risk degree for a virtual server, a server level pool, and a storage level pool on the input/output device 160 based on the information of the server level pool information table 1300, the storage level pool information table 1100, and the virtual server information table 2200. By this configuration a manager can comprehend a virtual server in which a risk of a stoppage is high in an appropriate manner. Moreover, the coping simulation part 1250 displays a coping measure that has been determined as executable by the coping execution availability determination part 1240, that is, the information for a coping measure that can be executed near an improvement point in a selectable manner on a screen shown in FIG. 26 based on the information of a coping measure that has been stored into the unnecessary virtual server table 1600, the server level virtual volume extension table 1700, the storage level pool extension table 1800, the migration table 1900, and the inter-storage level pool volume adjustment table 2000 or the like.

FIG. 26 is a view showing an example of a display screen for displaying an executable coping and a VM risk status.

The display screen displays the information that is corresponded to a risk degree on a graphic that indicates a virtual server in the case where as risk degree that indicates a possibility of a stoppage of a virtual server is high. Moreover the information that indicates a risk degree is displayed and a list of coping measures that can be taken to a risk degree is also displayed on a graphic that indicates a point that is a cause a risk degree that indicates a possibility of a stoppage of a virtual server (for instance, a storage level pool in FIG. 26). For instance, in the example of FIG. 26, a mark that indicates a risk is displayed for the VM1 and VM3, and a risk is displayed for the LLP. By the screen, a risk degree of a virtual server and a status of a point that is a cause can be comprehended in an appropriate manner.

Moreover, in the display screen of FIG. 26 a capacity reduction of a storage level virtual volume and an extension of a server level pool are displayed as a coping measure that can be executed to the LLP. In the example of FIG. 26, a selection area that is configured to select the coping measure is displayed corresponding to each coping measure in the list of coping measures. By this configuration, a manager can comprehend a coping measure that can be taken in an appropriate manner.

Figure 27:
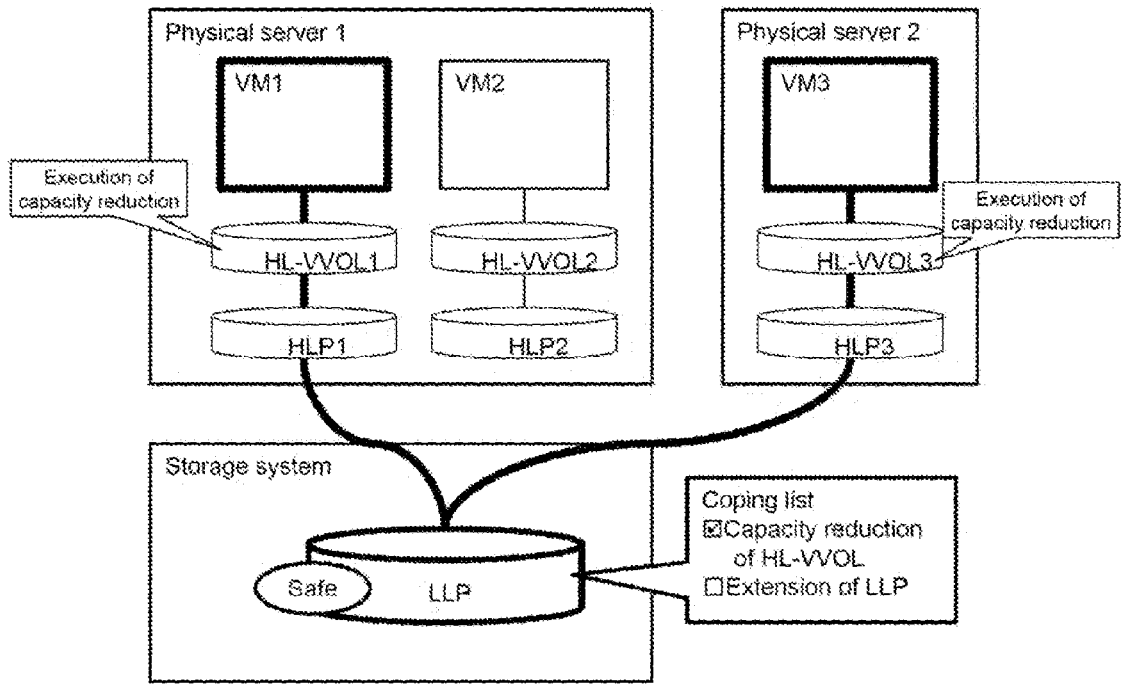
FIG. 27 is a view showing an example of a display screen for displaying a selection and a simulation result of an executable coping.

In the present embodiment, in the case where a selection area that is corresponded to a coping measure of the display screen is selected by an operation of the input/output device 160, the coping simulation part 1250 executes a simulation processing in the case were it is assumed that a coping measure that is corresponded to the selection area has been executed and displays a screen that is shown in FIG. 27 based on the simulation result. Moreover, a plurality of coping measures can also be selected simultaneously and the coping simulation part 1250 can also execute a simulation processing in the case where a plurality of coping measures are executed.

In the simulation processing, the coping simulation part 1250 identifies a record that is corresponded to a coping measure that has been selected from the unnecessary virtual server table 1600, the server level virtual volume extension table 1700, the storage level, pool extension table 1800, the migration table 1900, or the inter-storage level pool volume adjustment table 2000, calculates a capacity for a server level pool and a storage level pool in the case where a coping measure is executed based on the information of the record that has been identified, and executes a wide variety of processing (a risk degree calculation processing or the like) by a risk degree, calculation part 1210 that has been described above based on the capacity that has been calculated.

FIG. 27 is a view showing an example of a display screen for displaying a selection and a simulation result of an executable coping.

For the display screen, a selection area that is corresponded to a coping measure that has been selected is displayed as a selection status, a processing that is executed is displayed in a region that is corresponded to the coping measure (a server level virtual volume in FIG. 17), a risk degree in the case where the coping measure is executed is displayed to the virtual server, and the information that indicates a status in the case where the coping measure is executed in a point that is a cause. For instance, in the example of FIG. 27, since a risk degree is resolved for the VM1 and VM3, a mark that indicates a risk degree is not displayed and "Safe" is displayed for the LLP that is a point that is a cause. By the screen, a simulation result in the case where the coping measure is executed can be comprehended in an appropriate manner.

A simulation result in the case where a computer system is in a status that is shown in FIG. 28 will be described in detail.

In the case where a capacity of the HL-VVOL1 (VHD1) is reduced by 30 GB and is made to be 40 GB as a coping measure for instance, a use capacity of the HLP1 is 60 GB and a free capacity is 40 GB. Consequently, in the case where a risk degree is calculated again, a discrepancy degree is (90−40)/40=1.25 and a grace time is 40/2=20. As a result, a risk degree is "Safe".

Moreover, in the case where the HL-VVOL2 is migrated to the HLP2 as a coping measure for instance, a use capacity of the HLP1 is 90−20=70 GB and a free capacity is 30 GB. Consequently, in the case where a risk degree is calculated again, a discrepancy degree is (60−30)/30=1 and a grace time is 30/2=15. As a result, a risk degree is "Safe". Furthermore, a use capacity of the HLP2 is 10+20=30 GB and a free capacity is 70 GB. Consequently, in the case where a risk degree is calculated again, a discrepancy degree is (70−70)/70=1 and a grace time is 70/2=35. As a result, a risk degree is "Safe".

Moreover, in the case where the VM2 is deleted as a coping measure for instance, a use capacity of the HLP1 is 70 GB and a free capacity is 30 GB. Consequently, in the case where a risk degree is calculated again, a discrepancy degree is (90−30)/30=3 and a grace time is 30/2=15. As a result, a risk degree, is "Safe".

Moreover, in the case where ta capacity of the HLP1 is extended by 50 GB as a coping measure for instance, a free capacity of the HLP1 is 60 GB. Consequently, in the case where a risk degree is calculated again, a discrepancy degree is (90−60)/60=0.5 and a grace time is 60/2=30. As a result, a risk degree is "Safe".

While the some preferred embodiments according to the present invention have been described above, the embodiments are examples for describing the present invention and the scope of the present invention is not restricted to the above embodiments, in other words, the present invention can also be executed by other modes of every sort and kind.

REFERENCE SIGNS LIST

100: Management server
120: Management program
200 Physical server
220: Server level pool
300: Storage system
330: Storage level pool

The invention claimed is:

1. A management system for managing a storage system configured to comprise one or more volumes which belong to a storage level pool and a server computer coupled to the storage system and configured to execute a computer program, wherein the storage system is configured to supply a storage level virtual volume that is associated with the storage level pool, wherein an or all areas of the storage level virtual volume are areas to which area in the one or more volumes which belong to the storage level pool are not allocated, and wherein the server computer is configured to manage a server level pool to which the storage level virtual volume belongs and is configured to supply a server level virtual volume that is associated with the server level pool, the management system comprising:

a communication interface device configured to communicate with the storage system and the server computer;
a storage device; and
a processor coupled to the communication interface device and the storage device, and
wherein the processor is configured to:
(A) acquire the storage level pool information that includes the information of a capacity of the storage level pool from the storage system and store the storage level pool information that has been acquired to the storage device;
(B) acquire the server level pool information that includes the information of a capacity of the server level pool from the server computer and store the server level pool information that has been acquired to the storage device;
(C) determine a first risk degree that indicates a risk of a depletion of a free capacity of the storage level pool based on the storage level pool information;
(D) determine a second risk degree that indicates a risk of a depletion of a free capacity of the server level pool based on the server level pool information; and
(E) display the information that is associated with the first risk degree that indicate a risk of a depletion of a free capacity of the storage level pool and the second risk degree that indicate a risk of a depletion of a free capacity of the server level pool.

2. A management system according to claim 1,
wherein the storage level pool information is configured to include the information that indicates a physical free capacity of the storage level pool,
wherein the server level pool information is configured to include the information that indicates a physical free capacity of the server level pool and a capacity that is unallocated to the server level virtual volume, and
wherein the processor is configured to:
 in (C), calculate a first discrepancy degree that indicates the relationship between the physical free capacity of the storage level pool and an unallocated capacity in a virtual capacity to the server level virtual volume that is associated with the storage level pool based on the storage level pool information, and determine a first risk degree that indicates a risk of a depletion of a free capacity of the storage level pool based on the first discrepancy degree; and
 in (D), calculate a second discrepancy degree that indicates the relationship between the physical free capacity of the server level pool and an unallocated capacity in a virtual capacity to the server level virtual volume that is associated with the server level pool based on the server level pool information, and determine a second risk degree that indicates a risk of a depletion of a free capacity of the server level pool based on the second discrepancy degree.

3. A management system according to claim 2,
wherein the processor is configured to:
 in (C), calculate a first grace period to a depletion of a free capacity of the storage level pool based on the capacity variation information that indicates a variation tendency of a used capacity of the storage level pool, and determine a first risk degree that indicates a risk of a depletion of a free capacity of the storage level pool based on the first discrepancy degree and the first grace period; and
 in (D), calculate a second grace period to a depletion of a free capacity of the server level pool based on the capacity variation information that indicates a variation tendency of a used capacity of the server level pool, and determine a second risk degree that indicates a risk of a depletion of is free capacity of the server level pool based on the second discrepancy degree and the second grace period.

4. A management system according to claim 1,
wherein the processor is configured to:
 in (C), calculate a first grace period to a depletion of a free capacity of the storage level pool based on the capacity variation information that indicates a variation tendency of a used capacity of the storage level pool, and determine a first risk degree that indicates a risk of a depletion of as free capacity of the storage level pool based on the first grace period; and
 in (D), calculate a second grace period to a depletion of a free capacity of the server level pool based on the capacity variation information that indicates a variation tendency of a used capacity of the server level pool, and determine a second risk degree that indicates a risk of a depletion of a free capacity of the server level pool based on the second grace period.

5. A management system according to claim 1,
wherein the server computer is configured to store data that is used for a virtual machine to the server level virtual volume, and
wherein the processor is configured to:
 determine a third risk degree that indicates a risk of a stoppage of the virtual machine based on the first risk degree and the second risk degree; and
 display the information that is associated with the third risk degree.

6. A management system according to claim 2,
wherein the processor is configured to determine the first risk degree and the second risk degree based on the comparison result of the first and second discrepancy degrees and a first threshold value that is associated with a discrepancy degree that has been configured in advance.

7. A management system according to claim 4,
wherein the processor is configured to determine the first risk degree and the second risk degree based on the comparison result of the first and second grate periods arid a second threshold value that is associated with a grace period that has been configured in advance.

8. A management system according to claim 1,
wherein the processor is configured to detect a virtual machine that is configured to use the storage level pool that indicates that the risk degree is high, calculate an influence degree caused by a depletion of a free capacity of the storage level pool based on the virtual machine that has been detected, and display the influence degree in conjunction with the risk degree.

9. A management system according to claim 1,
wherein the processor is configured to detect an executable coping measure for reducing a risk degree of the storage level, pool and the server level pool that indicate that the risk degree is high, and display the information that is associated with the coping measure.

10. A management system according to claim 9,
wherein the processor is configured to receive a selection of any one of the coping measure, re-determine a risk degree of the storage level pool and the server level pool in the case where the coping measure is executed, and display the result of the re-determination.

11. A management system according to claim 9,
wherein the coping measure is any one of a reduction of a capacity of the server level virtual volume, a migration of the server level virtual volume, a reduction of the virtual machine, and an extension of a capacity of the server level pool.

12. A management method for managing a storage system configured to comprise one or more volumes which belong to a storage level pool and a server computer coupled to the storage system and configured to execute a computer program,
wherein the storage system is configured to supply a storage level virtual volume that is associated with the storage level pool, wherein an or all areas of the storage level virtual volume are areas to which areas in the one or more volumes which belong to the storage level pool are not allocated, and wherein the server computer is configured to manage a server level pool to which the storage level virtual volume belongs and is configured to supply a server level virtual volume that is associated with the server level pool, the management method comprising the steps of:
- (A) acquiring the storage level pool information that includes the information of a capacity of the storage level pool from the storage system;
- (B) acquiring the server level pool information that includes the information of a capacity of the server level pool from the server computer;
- (C) determining a first risk degree that indicates a risk of a depletion of a free capacity of the storage level pool based on the storage level pool information;
- (D) determining a second risk degree that indicates a risk of a depletion of a free capacity of the server level pool based on the server level pool information; and
- (E) displaying the information that is associated with the first risk degree that indicate a risk of a depletion of a free capacity of the storage level pool and the second risk degree that indicate a risk of a depletion of a free capacity of the server level pool.

13. A management method according to claim 12, wherein the storage level pool information is configured to include the information that indicates a physical free capacity of the storage level pool, wherein the server level pool information is configured to include the information that indicates a physical free capacity of the server level pool and a capacity that is unallocated to the server level virtual volume, and wherein the management method comprises the steps of:

in (C), calculating a first discrepancy degree that indicates the relationship between the physical free capacity of the storage level pool and an unallocated capacity in a virtual capacity to the server level virtual volume that is associated with the storage level pool based on the storage level pool information, and determining, a first risk degree that indicates a risk of a depletion of a free capacity of the storage level pool based on the first discrepancy degree; and in (D), calculating a second discrepancy degree that indicates the relationship between the physical free capacity of the server level pool and an unallocated capacity in a virtual capacity to the server level virtual volume that is associated with the server level pool based on the server level pool information, and determining a second risk degree that indicates a risk of a depletion of a free capacity of the server level pool based on the second discrepancy degree.

14. A management method according to claim 12, further comprising the steps of:

in (C), calculating a first grace period to a depletion of a free capacity of the storage level pool based on the capacity variation information that indicates a variation tendency of a used capacity of the storage level pool, and determining a first risk degree that indicates a risk of a depletion of a free capacity of the storage level pool based on the first grace period; and in (D), calculating a second grace period to a depletion of a free capacity of the server level pool based on the capacity variation information that indicates a variation tendency of a used capacity of the server level pool, and determining a second risk degree that indicates a risk of a depletion of a free capacity of the server level pool based on the second grace period.

\* \* \* \* \*